(12) United States Patent
Elvig

(10) Patent No.: US 11,041,139 B2
(45) Date of Patent: Jun. 22, 2021

(54) BREWING PROCESS

(75) Inventor: Niels Elvig, Holte (DK)

(73) Assignee: Novozymes A/S

( * ) Notice: Subject to any disclaimer, the term of this patent is extended or adjusted under 35 U.S.C. 154(b) by 0 days.

(21) Appl. No.: 12/745,208

(22) PCT Filed: Dec. 11, 2008

(86) PCT No.: PCT/EP2008/067331
§ 371 (c)(1),
(2), (4) Date: Jul. 14, 2010

(87) PCT Pub. No.: WO2009/074650
PCT Pub. Date: Jun. 18, 2009

(65) Prior Publication Data
US 2010/0303955 A1    Dec. 2, 2010

Related U.S. Application Data

(60) Provisional application No. 61/012,988, filed on Dec. 12, 2007.

(30) Foreign Application Priority Data

Dec. 12, 2007 (WO) ................ PCT/US2007/087209

(51) Int. Cl.
*C12C 7/047* (2006.01)
*C12C 5/00* (2006.01)

(52) U.S. Cl.
CPC .............. *C12C 7/047* (2013.01); *C12C 5/004* (2013.01); *C12C 5/006* (2013.01)

(58) Field of Classification Search
CPC .......... C12C 5/004; C12C 5/006; C12C 7/047
USPC ................... 426/11, 12, 16, 29, 592
See application file for complete search history.

(56) References Cited

U.S. PATENT DOCUMENTS

| | | | |
|---|---|---|---|
| 3,081,172 A | 3/1963 | Dennis et al. | |
| 4,318,927 A | 3/1982 | Marshall | |
| 4,355,047 A | 10/1982 | Line et al. | |
| 4,528,198 A | 7/1985 | Mizerak et al. | |
| 4,560,651 A | 12/1985 | Nielsen et al. | |
| 4,661,449 A | 4/1987 | Billon | |
| 4,666,718 A | 5/1987 | Lowery et al. | |
| 5,736,375 A | 4/1998 | Deweer et al. | |
| 5,867,763 A | 2/1999 | Dean | |
| 2006/0057684 A1 | 3/2006 | Bisgaard-Frantzen | |

FOREIGN PATENT DOCUMENTS

| EP | 1063285 A1 | 12/2000 | |
|---|---|---|---|
| GB | 190518351 | 9/1905 | |
| GB | 2056484 | 3/1981 | |
| GB | 2069527 | 8/1981 | |
| JP | 2004-173533 | 6/2004 | |
| WO | 1997/042301 A1 | 11/1997 | |
| WO | 99/01543 A1 | 1/1999 | |
| WO | 99/49011 A1 | 9/1999 | |
| WO | WO 99/45124 | 9/1999 | |
| WO | WO 00/01796 | 1/2000 | |
| WO | WO 01/51620 | 7/2001 | |
| WO | WO-0151620 A2 * | 7/2001 | ............... C12Q 1/34 |
| WO | 02/06442 A2 | 1/2002 | |
| WO | 2002/074895 A2 | 9/2002 | |
| WO | 02/092741 A2 | 11/2002 | |
| WO | WO 03/062409 | 7/2003 | |
| WO | WO 2004/011591 | 2/2004 | |
| WO | WO 2004/080923 | 9/2004 | |
| WO | WO 2005/059084 | 6/2005 | |
| WO | WO 2005/121305 | 12/2005 | |
| WO | WO 2007/000011 | 1/2007 | |
| WO | WO 2007/113292 | 10/2007 | |
| WO | WO 2007/144393 | 12/2007 | |
| ZA | 1998-03237 | 4/1998 | |

OTHER PUBLICATIONS

Anonymous, Handbuch zur Kontrolle des GVO-Verbotes im Ökologischen Landbau gemäss VO(EWG) Nr. 2092/91, pp. 1-42 (2003).
Anonymous, Brewing Industry Products, Grama Trading Ltd pp. 1-3 (2003).
Anonymous, Handbuch Abstract (2003).
Anonymous Handbuch Zur Kontrolle des GVO-Verbotes, pp. 1-42 (2003).
Goode et al., MBAA TQ, vol. 42, No. 3, pp. 184-198 (2005).
Kelly et al., FEMS, vol. 115, pp. 97-106 (1994).
Odibo et al., Mircen Journal, vol. 5, pp. 187-192 (1989).
AJ Wieg., Brewing Science, pp. 533-571 (1987).
Wieg et al., Process Biochemistry, vol. 4, No. 5, pp. 33-38 (1969).
AJ Wieg, Process Biochemistry, pp. 46-48 (1970).
Wilcox et al, Tech. Q. Master Brew Assoc. AM. vol. 14, No. 2, pp. 105-110 Abstract only (1977).
Genbank Access No. AAP04499 (2003) pp. 2.
Genbank Access No. CAC28076 (2006) pp. 2.
Zhong et al., Genbank Accession AAP04499.1 (1996).
Nielsen et al., Genbank Accession CAC28076 (2002).

(Continued)

*Primary Examiner* — Vera Stulii
(74) *Attorney, Agent, or Firm* — Elias Lambiris

(57) ABSTRACT

The invention relates to a process for the production of wort, comprising the enzymatic treatment of grist in up to 100% unmalted (grain) form, for further processing into high quality beverage products. By the addition of a combination of exogenous enzymes (α-amylase, isoamylase/pullulanase, FAN generating activity (proteases) and beta-glucanase activity) to the mash and by the simultaneously thermal activation of the maltose-generating endogenous β-amylase, it is possible to obtain a wort based on up to even 100% barley. The invention further relates to a process for the production of a high quality beer or beer product and to the high quality beer produced according to the process.

24 Claims, 1 Drawing Sheet
Specification includes a Sequence Listing.

(56) References Cited

OTHER PUBLICATIONS

Adrian et al, FEMS Microbiol Lett, vol. 115, No. 1, pp. 97-106 (1994).
Grama Trading Ltd, Brewing Industry Product 1-3 pages (2003).
Kelly et al,—EBI, Access No. 222515, 3 pages (1993).
Yang et al, 1986, Scientific research institute of food and fermentation industry, vol. 3, pp. 1-20.
Albini et al, 1987, Journal of the institute of brewing, vol. 93, No. 2, pp. 97-104.
Godfrey, 1999, European symposium on enzymes in grain processing.
Owuama, 1999, Journal of the Institute of Brewing, vol. 105, No. 1, pp. 23-24.

\* cited by examiner

SEQUENCE LISTING

```
<160> NUMBER OF SEQ ID NOS: 10

<210> SEQ ID NO 1
<211> LENGTH: 512
<212> TYPE: PRT
<213> ORGANISM: Artificial sequence
<220> FEATURE:
<223> OTHER INFORMATION: Synthetic construct
<220> FEATURE:
<221> NAME/KEY: misc_feature
<223> OTHER INFORMATION: Termamyl SC

<400> SEQUENCE: 1

Ala Ala Pro Phe Asn Gly Thr Met Met Gln Tyr Phe Glu Trp Tyr Leu
 1               5                  10                  15

Pro Asp Asp Gly Thr Leu Trp Thr Lys Val Ala Asn Glu Ala Asn Asn
                20                  25                  30

Leu Ser Ser Leu Gly Ile Thr Ala Leu Trp Leu Pro Pro Ala Tyr Lys
            35                  40                  45

Gly Thr Ser Arg Ser Asp Val Gly Tyr Gly Val Tyr Asp Leu Tyr Asp
        50                  55                  60

Leu Gly Glu Phe Asn Gln Lys Gly Ala Val Arg Thr Lys Tyr Gly Thr
65                  70                  75                  80

Lys Ala Gln Tyr Leu Gln Ala Ile Gln Ala Ala His Ala Ala Gly Met
                85                  90                  95

Gln Val Tyr Ala Asp Val Val Phe Asp His Lys Gly Gly Ala Asp Gly
               100                 105                 110

Thr Glu Trp Val Asp Ala Val Glu Val Asn Pro Ser Asp Arg Asn Gln
           115                 120                 125

Glu Ile Ser Gly Thr Tyr Gln Ile Gln Ala Trp Thr Lys Phe Asp Phe
       130                 135                 140

Pro Gly Arg Gly Asn Thr Tyr Ser Ser Phe Lys Trp Arg Trp Tyr His
145                 150                 155                 160
```

```
Phe Asp Gly Val Asp Trp Asp Glu Ser Arg Lys Leu Ser Arg Ile Tyr
            165                 170                 175
Lys Phe Arg Gly Lys Ala Trp Asp Trp Glu Val Asp Thr Glu Phe Gly
        180                 185                 190
Asn Tyr Asp Tyr Leu Met Tyr Ala Asp Leu Asp Met Asp His Pro Glu
    195                 200                 205
Val Val Thr Glu Leu Lys Ser Trp Gly Lys Trp Tyr Val Asn Thr Thr
210                 215                 220
Asn Ile Asp Gly Phe Arg Leu Asp Ala Val Lys His Ile Lys Phe Ser
225                 230                 235                 240
Phe Phe Pro Asp Trp Leu Ser Asp Val Arg Ser Gln Thr Gly Lys Pro
            245                 250                 255
Leu Phe Thr Val Gly Glu Tyr Trp Ser Tyr Asp Ile Asn Lys Leu His
        260                 265                 270
Asn Tyr Ile Met Lys Thr Asn Gly Thr Met Ser Leu Phe Asp Ala Pro
    275                 280                 285
Leu His Asn Lys Phe Tyr Thr Ala Ser Lys Ser Gly Gly Thr Phe Asp
    290                 295                 300
Met Arg Thr Leu Met Thr Asn Thr Leu Met Lys Asp Gln Pro Thr Leu
305                 310                 315                 320
Ala Val Thr Phe Val Asp Asn His Asp Thr Glu Pro Gly Gln Ala Leu
            325                 330                 335
Gln Ser Trp Val Asp Pro Trp Phe Lys Pro Leu Ala Tyr Ala Phe Ile
        340                 345                 350
Leu Thr Arg Gln Glu Gly Tyr Pro Cys Val Phe Tyr Gly Asp Tyr Tyr
    355                 360                 365
Gly Ile Pro Gln Tyr Asn Ile Pro Ser Leu Lys Ser Lys Ile Asp Pro
    370                 375                 380
Leu Leu Ile Ala Arg Arg Asp Tyr Ala Tyr Gly Thr Gln His Asp Tyr
385                 390                 395                 400
Leu Asp His Ser Asp Ile Ile Gly Trp Thr Arg Glu Gly Val Thr Glu
            405                 410                 415
Lys Pro Gly Ser Gly Leu Ala Ala Leu Ile Thr Asp Gly Pro Gly Gly
        420                 425                 430
Ser Lys Trp Met Tyr Val Gly Lys Gln His Ala Gly Lys Val Phe Tyr
    435                 440                 445
Asp Leu Thr Gly Asn Arg Ser Asp Thr Val Thr Ile Asn Ser Asp Gly
    450                 455                 460
Trp Gly Glu Phe Lys Val Asn Gly Gly Ser Val Ser Val Trp Val Pro
465                 470                 475                 480
Arg Lys Thr Thr Val Ser Thr Ile Ala Trp Ser Ile Thr Thr Arg Pro
            485                 490                 495
Trp Thr Asp Glu Phe Val Arg Trp Thr Glu Pro Arg Leu Val Ala Trp
        500                 505                 510
```

<210> SEQ ID NO 2
<211> LENGTH: 921
<212> TYPE: PRT
<213> ORGANISM: Bacillus acidopullulyticus
<220> FEATURE:
<221> NAME/KEY: misc_feature
<223> OTHER INFORMATION: Promozyme 400L

<400> SEQUENCE: 2

Asp Ser Thr Ser Thr Lys Val Ile Val His Tyr His Arg Phe Asp Ser

```
1               5                   10                  15
Asn Tyr Thr Asn Trp Asp Val Trp Met Trp Pro Tyr Gln Pro Val Asn
                20                  25              30
Gly Asn Gly Ala Ala Tyr Gln Phe Thr Gly Thr Asn Asp Asp Phe Gly
            35                  40                  45
Ala Val Ala Asp Thr Gln Val Pro Gly Asp Asn Thr Gln Val Gly Leu
        50                  55                  60
Ile Val Arg Lys Asn Asp Trp Ser Glu Lys Asn Thr Pro Asn Asp Leu
65                  70                  75                  80
His Ile Asp Leu Ala Lys Gly His Glu Val Trp Ile Val Gln Gly Asp
                85                  90                  95
Pro Thr Ile Tyr Tyr Asn Leu Ser Asp Ala Gln Ala Ala Ile Pro
                100                 105             110
Ser Val Ser Asn Ala Tyr Leu Asp Asp Glu Lys Thr Val Leu Ala Lys
            115                 120                 125
Leu Ser Met Pro Met Thr Leu Ala Asp Ala Ala Ser Gly Phe Thr Val
        130                 135                 140
Ile Asp Lys Thr Thr Gly Glu Lys Ile Pro Val Thr Ser Ala Val Ser
145                 150                 155                 160
Ala Asn Pro Val Thr Ala Val Leu Val Gly Asp Leu Gln Gln Ala Leu
                165                 170                 175
Gly Ala Ala Asn Asn Trp Ser Pro Asp Asp His Thr Leu Leu Lys
                180                 185             190
Lys Ile Asn Pro Asn Leu Tyr Gln Leu Ser Gly Thr Leu Pro Ala Gly
            195                 200                 205
Thr Tyr Gln Tyr Lys Ile Ala Leu Asp His Ser Trp Asn Thr Ser Tyr
        210                 215                 220
Pro Gly Asn Asn Val Ser Leu Thr Val Pro Gln Gly Gly Glu Lys Val
225                 230                 235                 240
Thr Phe Thr Tyr Ile Pro Ser Thr Asn Gln Val Phe Asp Ser Val Asn
                245                 250                 255
His Pro Asn Gln Ala Phe Pro Thr Ser Ser Ala Gly Val Gln Thr Asn
            260                 265                 270
Leu Val Gln Leu Thr Leu Ala Ser Ala Pro Asp Val Thr His Asn Leu
        275                 280                 285
Asp Val Ala Ala Asp Gly Tyr Lys Ala His Asn Ile Leu Pro Arg Asn
        290                 295                 300
Val Leu Asn Leu Pro Arg Tyr Asp Tyr Ser Gly Asn Asp Leu Gly Asn
305                 310                 315                 320
Val Tyr Ser Lys Asp Ala Thr Ser Phe Arg Val Trp Ala Pro Thr Ala
                325                 330                 335
Ser Asn Val Gln Leu Leu Leu Tyr Asn Ser Glu Lys Gly Ser Ile Thr
            340                 345                 350
Lys Gln Leu Glu Met Gln Lys Ser Asp Asn Gly Thr Trp Lys Leu Gln
        355                 360                 365
Val Ser Gly Asn Leu Glu Asn Trp Tyr Tyr Leu Tyr Gln Val Thr Val
        370                 375                 380
Asn Gly Thr Thr Gln Thr Ala Val Asp Pro Tyr Ala Arg Ala Ile Ser
385                 390                 395                 400
Val Asn Ala Thr Arg Gly Met Ile Val Asp Leu Lys Ala Thr Asp Pro
                405                 410                 415
Ala Gly Trp Gln Gly Asp His Glu Gln Thr Pro Ala Asn Pro Val Asp
            420                 425                 430
```

```
Glu Val Ile Tyr Glu Ala His Val Arg Asp Phe Ser Ile Asp Ala Asn
        435                 440                 445

Ser Gly Met Lys Asn Lys Gly Lys Tyr Leu Ala Phe Thr Glu His Gly
    450                 455                 460

Thr Lys Gly Pro Asp His Val Lys Thr Gly Ile Asp Ser Leu Lys Glu
465                 470                 475                 480

Leu Gly Ile Thr Thr Val Gln Leu Gln Pro Val Glu Glu Phe Asn Ser
                485                 490                 495

Ile Asp Glu Thr Gln Pro Asp Thr Tyr Asn Trp Gly Tyr Asp Pro Arg
            500                 505                 510

Asn Tyr Asn Val Pro Glu Gly Ala Tyr Ala Thr Thr Pro Glu Gly Thr
        515                 520                 525

Ala Arg Ile Thr Glu Leu Lys Gln Leu Ile Gln Ser Leu His Gln Gln
    530                 535                 540

Arg Ile Gly Val Asn Met Asp Val Val Tyr Asn His Thr Phe Asp Val
545                 550                 555                 560

Met Val Ser Asp Phe Asp Lys Ile Val Pro Gln Tyr Tyr Tyr Arg Thr
                565                 570                 575

Asp Ser Asn Gly Asn Tyr Thr Asn Gly Ser Gly Cys Gly Asn Glu Phe
            580                 585                 590

Ala Thr Glu His Pro Met Ala Gln Lys Phe Val Leu Asp Ser Val Asn
        595                 600                 605

Tyr Trp Val Asn Glu Tyr His Val Asp Gly Phe Arg Phe Asp Leu Met
    610                 615                 620

Ala Leu Leu Gly Lys Asp Thr Met Ala Lys Ile Ser Asn Glu Leu His
625                 630                 635                 640

Ala Ile Asn Pro Gly Ile Val Leu Tyr Gly Glu Pro Trp Thr Gly Gly
                645                 650                 655

Thr Ser Gly Leu Ser Ser Asp Gln Leu Val Thr Lys Gly Gln Gln Lys
            660                 665                 670

Gly Leu Gly Ile Gly Val Phe Asn Asp Asn Ile Arg Asn Gly Leu Asp
        675                 680                 685

Gly Asn Val Phe Asp Lys Thr Ala Gln Gly Phe Ala Thr Gly Asp Pro
    690                 695                 700

Asn Gln Val Asp Val Ile Lys Asn Gly Val Ile Gly Ser Ile Gln Asp
705                 710                 715                 720

Phe Thr Ser Ala Pro Ser Glu Thr Ile Asn Tyr Val Thr Ser His Asp
                725                 730                 735

Asn Met Thr Leu Trp Asp Lys Ile Leu Ala Ser Asn Pro Ser Asp Thr
            740                 745                 750

Glu Ala Asp Arg Ile Lys Met Asp Glu Leu Ala His Ala Val Val Phe
        755                 760                 765

Thr Ser Gln Gly Val Pro Phe Met Gln Gly Gly Glu Glu Met Leu Arg
    770                 775                 780

Thr Lys Gly Gly Asn Asp Asn Ser Tyr Asn Ala Gly Asp Ser Val Asn
785                 790                 795                 800

Gln Phe Asp Trp Ser Arg Lys Ala Gln Phe Lys Asp Val Phe Asp Tyr
                805                 810                 815

Phe Ser Ser Met Ile His Leu Arg Asn Gln His Pro Ala Phe Arg Met
            820                 825                 830

Thr Thr Ala Asp Gln Ile Lys Gln Asn Leu Thr Phe Leu Glu Ser Pro
        835                 840                 845
```

```
Thr Asn Thr Val Ala Phe Glu Leu Lys Asn Tyr Ala Asn His Asp Thr
        850                 855                 860

Trp Lys Asn Ile Ile Val Met Tyr Asn Pro Asn Lys Thr Ser Gln Thr
865                 870                 875                 880

Leu Asn Leu Pro Ser Gly Asp Trp Thr Ile Val Gly Leu Gly Asp Gln
                885                 890                 895

Ile Gly Glu Lys Ser Leu Gly His Val Met Gly Asn Val Gln Val Pro
                900                 905                 910

Ala Ile Ser Thr Leu Ile Leu Lys Gln
                915                 920

<210> SEQ ID NO 3
<211> LENGTH: 300
<212> TYPE: PRT
<213> ORGANISM: Bacillus amyloliquefaciens
<220> FEATURE:
<221> NAME/KEY: misc_feature
<223> OTHER INFORMATION: Neutrase

<400> SEQUENCE: 3

Ala Ala Thr Thr Gly Thr Gly Thr Thr Leu Lys Gly Lys Thr Val Ser
1               5                   10                  15

Leu Asn Ile Ser Ser Glu Ser Gly Lys Tyr Val Leu Arg Asp Leu Ser
                20                  25                  30

Lys Pro Thr Gly Thr Gln Ile Ile Thr Thr Asp Leu Gln Asn Arg Glu
            35                  40                  45

Tyr Asn Leu Pro Gly Thr Leu Val Ser Ser Thr Thr Asn Gln Phe Thr
        50                  55                  60

Thr Ser Ser Gln Arg Ala Ala Val Asp Ala His Tyr Asn Leu Gly Lys
65                  70                  75                  80

Val Tyr Asp Tyr Phe Tyr Gln Lys Phe Asn Arg Asn Ser Tyr Asp Asn
                85                  90                  95

Lys Gly Gly Lys Ile Val Ser Ser Val His Tyr Gly Ser Arg Tyr Asn
            100                 105                 110

Asn Ala Ala Trp Ile Gly Asp Gln Met Ile Tyr Gly Asp Gly Asp Gly
        115                 120                 125

Ser Phe Phe Ser Pro Leu Ser Gly Ser Met Asp Val Thr Ala His Glu
130                 135                 140

Met Thr His Gly Val Thr Gln Glu Thr Ala Asn Leu Asn Tyr Glu Asn
145                 150                 155                 160

Gln Pro Gly Ala Leu Asn Glu Ser Phe Ser Asp Val Phe Gly Tyr Phe
                165                 170                 175

Asn Asp Thr Glu Asp Trp Asp Ile Gly Glu Asp Ile Thr Val Ser Gln
            180                 185                 190

Pro Ala Leu Arg Ser Leu Ser Asn Pro Thr Lys Tyr Gly Gln Pro Asp
        195                 200                 205

Asn Phe Lys Asn Tyr Lys Asn Leu Pro Asn Thr Asp Ala Ala Ala Thr
    210                 215                 220

Thr Gly Thr Gly Thr Thr Leu Lys Gly Lys Thr Val Ser Leu Asn Ile
225                 230                 235                 240

Ser Ser Glu Ser Gly Lys Tyr Val Leu Arg Asp Leu Ser Lys Pro Thr
                245                 250                 255

Gly Thr Gln Ile Ile Thr Tyr Asp Leu Gln Asn Arg Glu Tyr Asn Leu
            260                 265                 270

Pro Gly Thr Leu Val Ser Ser Thr Thr Asn Gln Phe Thr Thr Ser Ser
        275                 280                 285
```

```
Gln Arg Ala Ala Val Asp Ala His Tyr Asn Leu Gly
    290             295             300
```

<210> SEQ ID NO 4
<211> LENGTH: 451
<212> TYPE: PRT
<213> ORGANISM: Aspergillus aculeatus
<220> FEATURE:
<221> NAME/KEY: misc_feature
<223> OTHER INFORMATION: Shearzyme

<400> SEQUENCE: 4

```
Met Val Gly Leu Leu Ser Ile Thr Ala Ala Leu Ala Ala Thr Val Leu
1               5                   10                  15

Pro Asn Ile Val Ser Ala Val Gly Leu Asp Gln Ala Ala Val Ala Lys
                20                  25                  30

Gly Leu Gln Tyr Phe Gly Thr Ala Thr Asp Asn Pro Glu Leu Thr Asp
            35                  40                  45

Ile Pro Tyr Val Thr Gln Leu Asn Asn Thr Ala Asp Phe Gly Gln Ile
    50                  55                  60

Thr Pro Gly Asn Ser Met Lys Trp Asp Ala Thr Glu Pro Ser Gln Gly
65                  70                  75                  80

Thr Phe Thr Phe Thr Lys Gly Asp Val Ile Ala Asp Leu Ala Glu Gly
                85                  90                  95

Asn Gly Gln Tyr Leu Arg Cys His Thr Leu Val Trp Tyr Asn Gln Leu
            100                 105                 110

Pro Ser Trp Val Thr Ser Gly Ser Trp Thr Asn Ala Thr Leu Thr Ala
    115                 120                 125

Ala Leu Lys Asn His Ile Thr Asn Val Val Ser His Tyr Lys Gly Lys
130                 135                 140

Cys Leu His Trp Asp Val Val Asn Glu Ala Leu Asn Asp Asp Gly Thr
145                 150                 155                 160

Tyr Arg Thr Asn Ile Phe Tyr Thr Thr Ile Gly Glu Ala Tyr Ile Pro
                165                 170                 175

Ile Ala Phe Ala Ala Ala Ala Ala Asp Pro Asp Ala Lys Leu Phe
            180                 185                 190

Tyr Asn Asp Tyr Asn Leu Glu Tyr Gly Gly Ala Lys Ala Ala Ser Ala
    195                 200                 205

Arg Ala Ile Val Gln Leu Val Lys Asn Ala Gly Ala Lys Ile Asp Gly
210                 215                 220

Val Gly Leu Gln Ala His Phe Ser Val Gly Thr Val Pro Ser Thr Ser
225                 230                 235                 240

Ser Leu Val Ser Val Leu Gln Ser Phe Thr Ala Leu Gly Val Glu Val
                245                 250                 255

Ala Tyr Thr Glu Ala Asp Val Arg Ile Leu Leu Pro Thr Thr Ala Thr
            260                 265                 270

Thr Leu Ala Gln Gln Ser Ser Asp Phe Gln Ala Leu Val Gln Ser Cys
    275                 280                 285

Val Gln Thr Thr Gly Cys Val Gly Phe Thr Ile Trp Asp Trp Thr Asp
290                 295                 300

Lys Tyr Ser Trp Val Pro Ser Thr Phe Ser Gly Tyr Gly Ala Ala Leu
305                 310                 315                 320

Pro Trp Asp Glu Asn Leu Val Lys Lys Pro Ala Tyr Asn Gly Leu Leu
                325                 330                 335

Ala Gly Met Gly Val Thr Val Thr Thr Thr Thr Thr Thr Thr Thr Ala
```

```
              340                 345                 350
Thr Ala Thr Gly Lys Thr Thr Thr Thr Thr Gly Ala Thr Ser Thr
            355                 360                 365

Gly Thr Thr Ala Ala His Trp Gly Gln Cys Gly Gly Leu Asn Trp Ser
370                 375                 380

Gly Pro Thr Ala Cys Ala Thr Gly Tyr Thr Cys Thr Tyr Val Asn Asp
385                 390                 395                 400

Tyr Tyr Ser Gln Cys Leu Ser Ile Ala Gln Pro Lys Pro Ala Gly Val
                405                 410                 415

Leu Ala Ile Gln Ser Val Arg Phe Ile Tyr His Asn Thr Gln Asn Ser
                420                 425                 430

Leu Leu Asp Leu Lys Lys Lys Thr Leu Glu His Thr Gly Gly Arg Ser
                435                 440                 445

Ser Met His
        450

<210> SEQ ID NO 5
<211> LENGTH: 316
<212> TYPE: PRT
<213> ORGANISM: Fusarium oxysporum
<220> FEATURE:
<221> NAME/KEY: misc_feature
<223> OTHER INFORMATION: Lipopan F

<400> SEQUENCE: 5

Ala Val Gly Val Thr Thr Thr Asp Phe Ser Asn Phe Lys Phe Tyr Ile
1               5                   10                  15

Gln His Gly Ala Ala Ala Tyr Cys Asn Ser Glu Ala Ala Ala Gly Ser
                20                  25                  30

Lys Ile Thr Cys Ser Asn Asn Gly Cys Pro Thr Val Gln Gly Asn Gly
            35                  40                  45

Ala Thr Ile Val Thr Ser Phe Val Gly Ser Lys Thr Gly Ile Gly Gly
        50                  55                  60

Tyr Val Ala Thr Asp Ser Ala Arg Lys Glu Ile Val Val Ser Phe Arg
65                  70                  75                  80

Gly Ser Ile Asn Ile Arg Asn Trp Leu Thr Asn Leu Asp Phe Gly Gln
                85                  90                  95

Glu Asp Cys Ser Leu Val Ser Gly Cys Gly Val His Ser Gly Phe Gln
            100                 105                 110

Arg Ala Trp Asn Glu Ile Ser Ser Gln Ala Thr Ala Ala Val Ala Ser
        115                 120                 125

Ala Arg Lys Ala Asn Pro Ser Phe Asn Val Ile Ser Thr Gly His Ser
130                 135                 140

Leu Gly Gly Ala Val Ala Val Leu Ala Ala Ala Asn Leu Arg Val Gly
145                 150                 155                 160

Gly Thr Pro Val Asp Ile Tyr Thr Tyr Gly Ser Pro Arg Val Gly Asn
                165                 170                 175

Ala Gln Leu Ser Ala Phe Val Ser Asn Gln Ala Gly Gly Glu Tyr Arg
            180                 185                 190

Val Thr His Ala Asp Asp Pro Val Pro Arg Leu Pro Pro Leu Ile Phe
        195                 200                 205

Gly Tyr Arg His Thr Thr Pro Glu Phe Trp Leu Ser Gly Gly Gly Gly
210                 215                 220

Asp Lys Val Asp Tyr Thr Ile Ser Asp Val Lys Val Cys Glu Gly Ala
225                 230                 235                 240
```

```
Ala Asn Leu Gly Cys Asn Gly Gly Thr Leu Gly Leu Asp Ile Ala Ala
                    245                 250                 255

His Leu His Tyr Phe Gln Ala Thr Asp Ala Cys Asn Ala Gly Gly Phe
            260                 265                 270

Ser Trp Arg Arg Tyr Arg Ser Ala Glu Ser Val Asp Lys Arg Ala Thr
            275                 280                 285

Met Thr Asp Ala Glu Leu Glu Lys Lys Leu Asn Ser Tyr Val Gln Met
    290                 295                 300

Asp Lys Glu Tyr Val Lys Asn Asn Gln Ala Arg Ser
305                 310                 315
```

<210> SEQ ID NO 6
<211> LENGTH: 410
<212> TYPE: PRT
<213> ORGANISM: Artificial sequence
<220> FEATURE:
<223> OTHER INFORMATION: Synthetic construct
<220> FEATURE:
<221> NAME/KEY: misc_feature
<223> OTHER INFORMATION: Phytase Ronozyme NP

<400> SEQUENCE: 6

```
Gln Leu Pro Ile Pro Ala Gln Asn Thr Ser Asn Trp Gly Pro Tyr Ser
1               5                   10                  15

Pro Phe Phe Pro Val Glu Pro Tyr Ala Ala Pro Pro Glu Gly Cys Thr
                20                  25                  30

Val Thr Gln Val Asn Leu Ile Gln Arg His Gly Ala Arg Trp Pro Thr
            35                  40                  45

Ser Gly Ala Arg Ser Arg Gln Val Ala Ala Val Ala Lys Ile Gln Met
    50                  55                  60

Ala Arg Pro Phe Thr Asp Pro Lys Tyr Glu Phe Leu Asn Asp Phe Val
65                  70                  75                  80

Tyr Thr Phe Gly Val Ala Asp Leu Leu Pro Phe Gly Ala Asn Gln Ser
                85                  90                  95

Tyr Gln Thr Gly Thr Asp Met Tyr Thr Arg Tyr Ser Thr Leu Phe Glu
            100                 105                 110

Gly Gly Asp Val Pro Phe Val Arg Ala Ala Gly Asp Asn Arg Val Val
    115                 120                 125

Asp Ser Ser Thr Asn Trp Thr Ala Gly Phe Gly Asp Ala Ser Gly Glu
130                 135                 140

Thr Val Leu Pro Thr Leu Gln Val Val Leu Gln Glu Glu Gly Asn Cys
145                 150                 155                 160

Thr Leu Cys Asn Asn Met Cys Pro Asn Trp Val Lys Gly Asp Glu Ser
                165                 170                 175

Thr Thr Trp Leu Gly Val Phe Ala Pro Asn Ile Thr Ala Arg Leu Asn
            180                 185                 190

Ala Ala Ala Pro Ser Ala Asn Leu Ser Asp Ser Asp Ala Leu Thr Leu
    195                 200                 205

Met Asp Met Cys Pro Phe Asp Thr Leu Ser Ser Gly Asn Ala Ser Pro
210                 215                 220

Phe Cys Asp Leu Phe Thr Ala Glu Glu Tyr Thr Ser Tyr Glu Tyr Tyr
225                 230                 235                 240

Tyr Asp Leu Asp Lys Tyr Tyr Gly Thr Gly Pro Gly Asn Ala Leu Gly
                245                 250                 255

Pro Val Gln Gly Val Gly Tyr Val Asn Glu Leu Leu Ala Arg Leu Thr
            260                 265                 270
```

```
Gly Gln Ala Val Arg Asp Glu Thr Gln Thr Asn Arg Thr Leu Asp Ser
            275                 280                 285

Asp Pro Ala Thr Phe Pro Leu Asn Arg Thr Phe Tyr Ala Asp Phe Ser
290                 295                 300

His Asp Asn Thr Met Val Ala Ile Phe Ala Ala Leu Gly Leu Phe Asn
305                 310                 315                 320

Ala Thr Ala Leu Asp Pro Leu Lys Pro Asp Glu Asn Arg Leu Trp Val
                325                 330                 335

Val Ser Lys Leu Val Pro Phe Ser Gly His Met Thr Val Glu Lys Leu
                340                 345                 350

Ala Cys Ser Gly Lys Glu Ala Val Arg Val Leu Val Asn Asp Ala Val
            355                 360                 365

Gln Pro Leu Glu Phe Cys Gly Val Asp Gly Val Cys Glu Leu Ser
370                 375                 380

Ala Phe Val Glu Ser Gln Thr Tyr Ala Arg Glu Asn Gly Gln Gly Asp
385                 390                 395                 400

Phe Ala Lys Cys Gly Phe Val Pro Ser Glu
                405                 410

<210> SEQ ID NO 7
<211> LENGTH: 928
<212> TYPE: PRT
<213> ORGANISM: Bacillus deramificans
<220> FEATURE:
<221> NAME/KEY: mat_peptide
<222> LOCATION: (1)..(928)

<400> SEQUENCE: 7

Asp Gly Asn Thr Thr Thr Ile Ile Val His Tyr Phe Arg Pro Ala Gly
1               5                   10                  15

Asp Tyr Gln Pro Trp Ser Leu Trp Met Trp Pro Lys Asp Gly Gly Gly
                20                  25                  30

Ala Glu Tyr Asp Phe Asn Gln Pro Ala Asp Ser Phe Gly Ala Val Ala
            35                  40                  45

Ser Ala Asp Ile Pro Gly Asn Pro Ser Gln Val Gly Ile Ile Val Arg
50                  55                  60

Thr Gln Asp Trp Thr Lys Asp Val Ser Ala Asp Arg Tyr Ile Asp Leu
65                  70                  75                  80

Ser Lys Gly Asn Glu Val Trp Leu Val Glu Gly Asn Ser Gln Ile Phe
                85                  90                  95

Tyr Asn Glu Lys Asp Ala Glu Asp Ala Ala Lys Pro Ala Val Ser Asn
                100                 105                 110

Ala Tyr Leu Asp Ala Ser Asn Gln Val Leu Val Lys Leu Ser Gln Pro
            115                 120                 125

Leu Thr Leu Gly Glu Gly Ala Ser Gly Phe Thr Val His Asp Asp Thr
130                 135                 140

Ala Asn Lys Asp Ile Pro Val Thr Ser Val Lys Asp Ala Ser Leu Gly
145                 150                 155                 160

Gln Asp Val Thr Ala Val Leu Ala Gly Thr Phe Gln His Ile Phe Gly
                165                 170                 175

Gly Ser Asp Trp Ala Pro Asp Asn His Ser Thr Leu Leu Lys Lys Val
                180                 185                 190

Thr Asn Asn Leu Tyr Gln Phe Ser Gly Asp Leu Pro Glu Gly Asn Tyr
            195                 200                 205

Gln Tyr Lys Val Ala Leu Asn Asp Ser Trp Asn Asn Pro Ser Tyr Pro
210                 215                 220
```

```
Ser Asp Asn Ile Asn Leu Thr Val Pro Ala Gly Ala His Val Thr
225                 230                 235                 240

Phe Ser Tyr Ile Pro Ser Thr His Ala Val Tyr Asp Thr Ile Asn Asn
            245                 250                 255

Pro Asn Ala Asp Leu Gln Val Glu Ser Gly Val Lys Thr Asp Leu Val
                260                 265                 270

Thr Val Thr Leu Gly Glu Asp Pro Asp Val Ser His Thr Leu Ser Ile
            275                 280                 285

Gln Thr Asp Gly Tyr Gln Ala Lys Gln Val Ile Pro Arg Asn Val Leu
290                 295                 300

Asn Ser Ser Gln Tyr Tyr Tyr Ser Gly Asp Leu Gly Asn Thr Tyr
305                 310                 315                 320

Thr Gln Lys Ala Thr Thr Phe Lys Val Trp Ala Pro Thr Ser Thr Gln
                325                 330                 335

Val Asn Val Leu Leu Tyr Asp Ser Ala Thr Gly Ser Val Thr Lys Ile
            340                 345                 350

Val Pro Met Thr Ala Ser Gly His Gly Val Trp Glu Ala Thr Val Asn
            355                 360                 365

Gln Asn Leu Glu Asn Trp Tyr Tyr Met Tyr Glu Val Thr Gly Gln Gly
370                 375                 380

Ser Thr Arg Thr Ala Val Asp Pro Tyr Ala Thr Ala Ile Ala Pro Asn
385                 390                 395                 400

Gly Thr Arg Gly Met Ile Val Asp Leu Ala Lys Thr Asp Pro Ala Gly
                405                 410                 415

Trp Asn Ser Asp Lys His Ile Thr Pro Lys Asn Ile Glu Asp Glu Val
                420                 425                 430

Ile Tyr Glu Met Asp Val Arg Asp Phe Ser Ile Asp Pro Asn Ser Gly
            435                 440                 445

Met Lys Asn Lys Gly Lys Tyr Leu Ala Leu Thr Glu Lys Gly Thr Lys
            450                 455                 460

Gly Pro Asp Asn Val Lys Thr Gly Ile Asp Ser Leu Lys Gln Leu Gly
465                 470                 475                 480

Ile Thr His Val Gln Leu Met Pro Val Phe Ala Ser Asn Ser Val Asp
                485                 490                 495

Glu Thr Asp Pro Thr Gln Asp Asn Trp Gly Tyr Asp Pro Arg Asn Tyr
                500                 505                 510

Asp Val Pro Glu Gly Gln Tyr Ala Thr Asn Ala Asn Gly Asn Ala Arg
            515                 520                 525

Ile Lys Glu Phe Lys Glu Met Val Leu Ser Leu His Arg Glu His Ile
            530                 535                 540

Gly Val Asn Met Asp Val Val Tyr Asn His Thr Phe Ala Thr Gln Ile
545                 550                 555                 560

Ser Asp Phe Asp Lys Ile Val Pro Glu Tyr Tyr Tyr Arg Thr Asp Asp
                565                 570                 575

Ala Gly Asn Tyr Thr Asn Gly Ser Gly Thr Gly Asn Glu Ile Ala Ala
            580                 585                 590

Glu Arg Pro Met Val Gln Lys Phe Ile Ile Asp Ser Leu Lys Tyr Trp
            595                 600                 605

Val Asn Glu Tyr His Ile Asp Gly Phe Arg Phe Asp Leu Met Ala Leu
            610                 615                 620

Leu Gly Lys Asp Thr Met Ser Lys Ala Ala Ser Glu Leu His Ala Ile
625                 630                 635                 640
```

```
Asn Pro Gly Ile Ala Leu Tyr Gly Glu Pro Trp Thr Gly Gly Thr Ser
            645                 650                 655

Ala Leu Pro Asp Asp Gln Leu Leu Thr Lys Gly Ala Gln Lys Gly Met
        660                 665                 670

Gly Val Ala Val Phe Asn Asp Asn Leu Arg Asn Ala Leu Asp Gly Asn
            675                 680                 685

Val Phe Asp Ser Ser Ala Gln Gly Phe Ala Thr Gly Ala Thr Gly Leu
        690                 695                 700

Thr Asp Ala Ile Lys Asn Gly Val Glu Gly Ser Ile Asn Asp Phe Thr
705                 710                 715                 720

Ser Ser Pro Gly Glu Thr Ile Asn Tyr Val Thr Ser His Asp Asn Tyr
            725                 730                 735

Thr Leu Trp Asp Lys Ile Ala Leu Ser Asn Pro Asn Asp Ser Glu Ala
        740                 745                 750

Asp Arg Ile Lys Met Asp Glu Leu Ala Gln Ala Val Val Met Thr Ser
            755                 760                 765

Gln Gly Val Pro Phe Met Gln Gly Gly Glu Glu Met Leu Arg Thr Lys
        770                 775                 780

Gly Gly Asn Asp Asn Ser Tyr Asn Ala Gly Asp Ala Val Asn Glu Phe
785                 790                 795                 800

Asp Trp Ser Arg Lys Ala Gln Tyr Pro Asp Val Phe Asn Tyr Tyr Ser
            805                 810                 815

Gly Leu Ile His Leu Arg Leu Asp His Pro Ala Phe Arg Met Thr Thr
        820                 825                 830

Ala Asn Glu Ile Asn Ser His Leu Gln Phe Leu Asn Ser Pro Glu Asn
            835                 840                 845

Thr Val Ala Tyr Glu Leu Thr Asp His Val Asn Lys Asp Lys Trp Gly
        850                 855                 860

Asn Ile Ile Val Val Tyr Asn Pro Asn Lys Thr Val Ala Thr Ile Asn
865                 870                 875                 880

Leu Pro Ser Gly Lys Trp Ala Ile Asn Ala Thr Ser Gly Lys Val Gly
            885                 890                 895

Glu Ser Thr Leu Gly Gln Ala Glu Gly Ser Val Gln Val Pro Gly Ile
        900                 905                 910

Ser Met Met Ile Leu His Gln Glu Val Ser Pro Asp His Gly Lys Lys
            915                 920                 925

<210> SEQ ID NO 8
<211> LENGTH: 829
<212> TYPE: PRT
<213> ORGANISM: Bacillus acidopullulyticus
<220> FEATURE:
<221> NAME/KEY: mat_peptide
<222> LOCATION: (1)..(829)

<400> SEQUENCE: 8

Asp Ser Thr Ser Thr Glu Val Ile Val His Tyr His Arg Phe Asp Ser
1               5                   10                  15

Asn Tyr Ala Asn Trp Asp Leu Trp Met Trp Pro Tyr Gln Pro Val Asn
            20                  25                  30

Gly Asn Gly Ala Ala Tyr Glu Phe Ser Gly Lys Asp Asp Phe Gly Val
        35                  40                  45

Lys Ala Asp Val Gln Val Pro Gly Asp Asp Thr Gln Val Gly Leu Ile
    50                  55                  60

Val Arg Thr Asn Asp Trp Ser Gln Lys Asn Thr Ser Asp Asp Leu His
65                  70                  75                  80
```

-continued

Ile Asp Leu Thr Lys Gly His Glu Ile Trp Ile Val Gln Gly Asp Pro
            85                  90                  95

Asn Ile Tyr Tyr Asn Leu Ser Asp Ala Gln Ala Ala Thr Pro Lys
            100                 105                 110

Val Ser Asn Ala Tyr Leu Asp Asn Glu Lys Thr Val Leu Ala Lys Leu
            115                 120                 125

Thr Asn Pro Met Thr Leu Ser Asp Gly Ser Ser Gly Phe Thr Val Thr
130                 135                 140

Asp Lys Thr Thr Gly Glu Gln Ile Pro Val Thr Ala Ala Thr Asn Ala
145                 150                 155                 160

Asn Ser Ala Ser Ser Glu Gln Thr Asp Leu Val Gln Leu Thr Leu
            165                 170                 175

Ala Ser Ala Pro Asp Val Ser His Thr Ile Gln Val Gly Ala Ala Gly
            180                 185                 190

Tyr Glu Ala Val Asn Leu Ile Pro Arg Asn Val Leu Asn Leu Pro Arg
            195                 200                 205

Tyr Tyr Tyr Ser Gly Asn Asp Leu Gly Asn Val Tyr Ser Asn Lys Ala
            210                 215                 220

Thr Ala Phe Arg Val Trp Ala Pro Thr Ala Ser Asp Val Gln Leu Leu
225                 230                 235                 240

Leu Tyr Asn Ser Glu Thr Gly Pro Val Thr Lys Gln Leu Glu Met Gln
            245                 250                 255

Lys Ser Asp Asn Gly Thr Trp Lys Leu Lys Val Pro Gly Asn Leu Lys
            260                 265                 270

Asn Trp Tyr Tyr Leu Tyr Gln Val Thr Val Asn Gly Lys Thr Gln Thr
            275                 280                 285

Ala Val Asp Pro Tyr Val Arg Ala Ile Ser Val Asn Ala Thr Arg Gly
            290                 295                 300

Met Ile Val Asp Leu Glu Asp Thr Asn Pro Pro Gly Trp Lys Glu Asp
305                 310                 315                 320

His Gln Gln Thr Pro Ala Asn Pro Val Asp Glu Val Ile Tyr Glu Val
            325                 330                 335

His Val Arg Asp Phe Ser Ile Asp Ala Asn Ser Gly Met Lys Asn Lys
            340                 345                 350

Gly Lys Tyr Leu Ala Phe Thr Glu His Gly Thr Lys Gly Pro Asp Asn
            355                 360                 365

Val Lys Thr Gly Ile Asp Ser Leu Lys Glu Leu Gly Ile Asn Ala Val
            370                 375                 380

Gln Leu Gln Pro Ile Glu Glu Phe Asn Ser Ile Asp Glu Thr Gln Pro
385                 390                 395                 400

Asn Met Tyr Asn Trp Gly Tyr Asp Pro Arg Asn Tyr Asn Val Pro Glu
            405                 410                 415

Gly Ala Tyr Ala Thr Thr Pro Glu Gly Thr Ala Arg Ile Thr Gln Leu
            420                 425                 430

Lys Gln Leu Ile Gln Ser Ile His Lys Asp Arg Ile Ala Ile Asn Met
            435                 440                 445

Asp Val Val Tyr Asn His Thr Phe Asn Val Gly Val Ser Asp Phe Asp
            450                 455                 460

Lys Ile Val Pro Gln Tyr Tyr Arg Thr Asp Ser Ala Gly Asn Tyr
465                 470                 475                 480

Thr Asn Gly Ser Gly Val Gly Asn Glu Ile Ala Thr Glu Arg Pro Met
            485                 490                 495

```
Val Gln Lys Phe Val Leu Asp Ser Val Lys Tyr Trp Val Lys Glu Tyr
            500                 505                 510

His Ile Asp Gly Phe Arg Phe Asp Leu Met Ala Leu Leu Gly Lys Asp
            515                 520                 525

Thr Met Ala Lys Ile Ser Lys Glu Leu His Ala Ile Asn Pro Gly Ile
            530                 535                 540

Val Leu Tyr Gly Glu Pro Trp Thr Gly Gly Thr Ser Gly Leu Ser Ser
545                 550                 555                 560

Asp Gln Leu Val Thr Lys Gly Gln Gln Lys Gly Leu Gly Ile Gly Val
                565                 570                 575

Phe Asn Asp Asn Ile Arg Asn Gly Leu Asp Gly Asn Val Phe Asp Lys
                580                 585                 590

Ser Ala Gln Gly Phe Ala Thr Gly Asp Pro Asn Gln Val Asn Val Ile
                595                 600                 605

Lys Asn Gly Val Met Gly Ser Ile Ser Asp Phe Thr Ser Ala Pro Ser
            610                 615                 620

Glu Thr Ile Asn Tyr Val Thr Ser His Asp Asn Met Thr Leu Trp Asp
625                 630                 635                 640

Lys Ile Ser Ala Ser Asn Pro Asn Asp Thr Gln Ala Asp Arg Ile Lys
                645                 650                 655

Met Asp Glu Leu Ala Gln Ala Val Val Phe Thr Ser Gln Gly Val Pro
                660                 665                 670

Phe Met Gln Gly Gly Glu Glu Met Leu Arg Thr Lys Gly Gly Asn Asp
                675                 680                 685

Asn Ser Tyr Asn Ala Gly Asp Ser Val Asn Gln Phe Asp Trp Ser Arg
            690                 695                 700

Lys Ala Gln Phe Glu Asn Val Phe Asp Tyr Tyr Ser Trp Leu Ile His
705                 710                 715                 720

Leu Arg Asp Asn His Pro Ala Phe Arg Met Thr Thr Ala Asp Gln Ile
                725                 730                 735

Lys Gln Asn Leu Thr Phe Leu Asp Ser Pro Thr Asn Thr Val Ala Phe
                740                 745                 750

Glu Leu Lys Asn His Ala Asn His Asp Lys Trp Lys Asn Ile Ile Val
                755                 760                 765

Met Tyr Asn Pro Asn Lys Thr Ala Gln Thr Leu Thr Leu Pro Ser Gly
            770                 775                 780

Asn Trp Thr Ile Val Gly Leu Gly Asn Gln Val Gly Glu Lys Ser Leu
785                 790                 795                 800

Gly His Val Asn Gly Thr Val Glu Val Pro Ala Leu Ser Thr Ile Ile
                805                 810                 815

Leu His Gln Gly Thr Ser Glu Asp Val Ile Asp Gln Asn
            820                 825

<210> SEQ ID NO 9
<211> LENGTH: 269
<212> TYPE: PRT
<213> ORGANISM: Thermomyces T. lanuginosus
<220> FEATURE:
<221> NAME/KEY: mat_peptide
<222> LOCATION: (1)..(269)

<400> SEQUENCE: 9

Glu Val Ser Gln Asp Leu Phe Asn Gln Phe Asn Leu Phe Ala Gln Tyr
1               5                   10                  15

Ser Ala Ala Ala Tyr Cys Gly Lys Asn Asn Asp Ala Pro Ala Gly Thr
            20                  25                  30
```

Asn Ile Thr Cys Thr Gly Asn Ala Cys Pro Glu Val Glu Lys Ala Asp
            35                  40                  45

Ala Thr Phe Leu Tyr Ser Phe Glu Asp Ser Gly Val Gly Asp Val Thr
        50                  55                  60

Gly Phe Leu Ala Leu Asp Asn Thr Asn Lys Leu Ile Val Leu Ser Phe
65                  70                  75                  80

Arg Gly Ser Arg Ser Ile Glu Asn Trp Ile Gly Asn Leu Asn Phe Asp
                85                  90                  95

Leu Lys Glu Ile Asn Asp Ile Cys Ser Gly Cys Arg Gly His Asp Gly
            100                 105                 110

Phe Thr Ser Ser Trp Arg Ser Val Ala Asp Thr Leu Arg Gln Lys Val
        115                 120                 125

Glu Asp Ala Val Arg Glu His Pro Asp Tyr Arg Val Val Phe Thr Gly
130                 135                 140

His Ser Leu Gly Gly Ala Leu Ala Thr Val Ala Gly Ala Asp Leu Arg
145                 150                 155                 160

Gly Asn Gly Tyr Asp Ile Asp Val Phe Ser Tyr Gly Ala Pro Arg Val
                165                 170                 175

Gly Asn Arg Ala Phe Ala Glu Phe Leu Thr Val Gln Thr Gly Gly Thr
            180                 185                 190

Leu Tyr Arg Ile Thr His Thr Asn Asp Ile Val Pro Arg Leu Pro Pro
        195                 200                 205

Arg Glu Phe Gly Tyr Ser His Ser Ser Pro Glu Tyr Trp Ile Lys Ser
210                 215                 220

Gly Thr Leu Val Pro Val Thr Arg Asn Asp Ile Val Lys Ile Glu Gly
225                 230                 235                 240

Ile Asp Ala Thr Gly Gly Asn Asn Gln Pro Asn Ile Pro Asp Ile Pro
                245                 250                 255

Ala His Leu Trp Tyr Phe Gly Leu Ile Gly Thr Cys Leu
            260                 265

<210> SEQ ID NO 10
<211> LENGTH: 269
<212> TYPE: PRT
<213> ORGANISM: Thermomyces T. lanuginosus
<220> FEATURE:
<221> NAME/KEY: misc_feature
<222> LOCATION: (1)..(269)

<400> SEQUENCE: 10

Glu Val Ser Gln Asp Leu Phe Asn Gln Phe Asn Leu Phe Ala Gln Tyr
1               5                   10                  15

Ser Ala Ala Ala Tyr Cys Gly Lys Asn Asn Asp Ala Pro Ala Gly Thr
            20                  25                  30

Asn Ile Thr Cys Thr Gly Asn Ala Cys Pro Glu Val Glu Lys Ala Asp
            35                  40                  45

Ala Thr Phe Leu Tyr Ser Phe Glu Asp Ser Gly Val Gly Asp Val Thr
        50                  55                  60

Gly Phe Leu Ala Leu Asp Asn Thr Asn Lys Leu Ile Val Leu Ser Phe
65                  70                  75                  80

Arg Gly Ser Arg Ser Ile Glu Asn Trp Ile Gly Asn Leu Asn Phe Asp
                85                  90                  95

Leu Lys Glu Ile Asn Asp Ile Cys Ser Gly Cys Arg Gly His Asp Gly
            100                 105                 110

Phe Thr Ser Ser Trp Arg Ser Val Ala Asp Thr Leu Arg Gln Lys Val

```
                115                 120                 125
Glu Asp Ala Val Arg Glu His Pro Asp Tyr Arg Val Val Phe Thr Gly
    130                 135                 140
His Ser Leu Gly Gly Ala Leu Ala Thr Val Ala Gly Ala Asp Leu Arg
145                 150                 155                 160
Gly Asn Gly Tyr Asp Ile Asp Val Phe Ser Tyr Gly Ala Pro Arg Val
                165                 170                 175
Gly Asn Arg Ala Phe Ala Glu Phe Leu Thr Val Gln Thr Gly Gly Thr
            180                 185                 190
Leu Tyr Arg Ile Thr His Thr Asn Asp Ile Val Pro Arg Leu Pro Pro
        195                 200                 205
Arg Glu Phe Gly Tyr Ser His Ser Ser Pro Glu Tyr Trp Ile Lys Ser
    210                 215                 220
Gly Thr Leu Val Pro Val Arg Arg Arg Asp Ile Val Lys Ile Glu Gly
225                 230                 235                 240
Ile Asp Ala Thr Gly Gly Asn Asn Gln Pro Asn Ile Pro Asp Ile Pro
                245                 250                 255
Ala His Leu Trp Tyr Phe Gly Leu Ile Gly Thr Cys Leu
            260                 265
```

BREWING PROCESS

CROSS-REFERENCE TO RELATED APPLICATIONS

This application is a 35 U.S.C. 371 national application of PCT/EP2008/067331 filed Dec. 11, 2008, which claims priority or the benefit under 35 U.S.C. 119 of PCT/US2007/087209 filed Dec. 12, 2007 and U.S. provisional application No. 61/012,988 filed Dec. 12, 2007, the contents of which are fully incorporated herein by reference.

REFERENCE TO A SEQUENCE LISTING

This application contains a sequence listing in computer readable form. The computer readable form is incorporated herein by reference.

TECHNICAL FIELD OF THE INVENTION

The invention relates to a process for the production of a brewer's wort, comprising an enzymatic treatment of a grist comprising up to 100% unmalted (grain) form, and further relates to the wort obtainable by the process.

The invention further relates to the use of said wort for the further processing into high quality beverage products and relates to a process for the production of a high quality beer or beer product, and to the high quality beer produced according to the process. In addition the invention relates to enzyme mixtures.

BACKGROUND OF THE INVENTION

Mashing is the process of converting starch from the milled barley malt and adjuncts into fermentable and unfermentable sugars to produce wort of the desired composition. Traditional mashing involves mixing milled barley malt and adjuncts with water at a set temperature and volume to continue the biochemical changes initiated during the malting process. The mashing process is conducted over a period of time at various temperatures in order to activate the endogenous enzymes responsible for the degradation of proteins and carbohydrates. After the mashing process the mash is filtered to obtain the wort for the fermentation to beer. Traditionally, beer has been brewed from malted barley, hops, yeast and water. Malting cereals such as barley activate the endogenous enzymes necessary for degradation of the starch. However, the malting process is energy and time-consuming and thereby rather costly. Thus, one way to reduce costs is to substitute some of the malt with readily available adjuncts such as refined starch or readily fermentable carbohydrates and/or substituting with unmalted cereals, such as barley corn, rice, sorghum, and wheat. However, unmalted cereals lack endogenous enzymes, which may result in incomplete saccharification, increased mash/wort viscosity, lautering difficulties, poor fermentability, beer filtration difficulties, colloidal instability and poor flavour. Exogenous enzymes such as alpha-amylase and β-glucanase have previously been added to compensate for the lacking malt enzymes. The following prior art describes the substitution of part of the malted cereals with unmalted cereals and exogenously added enzymes.

ZA9803237 describes a process for producing a beer by fermenting a wort obtained from partly unmalted barley and an enzyme blend of alpha-amylase, β-glucanase and proteinase. Wieg et. al. Process Biochemistry, 1970 also describes a process for brewing with a mixture of malted and unmalted barley and an enzyme blend of alpha-amylase, β-glucanase and proteinase. Further WO04/011591 describes a process for producing a wort adding a protease and a cellulase to a mash from maltet and unmalted barley. A resume of barley brewing is given by Wieg et. al. Brewing science, 1987.

Another way to produce wort is known from the Japanese Happoshu beers. In Japan, taxes on malt-containing alcohol beverages are relatively high, which is why Happoshu beers are brewed with as less as 25% malted barley. Usually, mash prepared on such a low content of malt is impossible to filter in order to obtain the wort, as the mash is too thick for filtering. There are only few technical descriptions available concerning the composition of the Happoshu mash. However, it is known that it is necessary to add exogenous enzymes to the mash in order to obtain filterability, e.g. proteinases, β-glucanase and amylases. The Happoshu beers have different flavor characteristics even compared to traditional beers of the more plain lager type. JP 2004173533 describes the production of such a beer with use of pressed barley and lesser amount of malt. Different enzymes are used to aid e.g. saccharification.

The wort obtained in the prior art references are based on grist comprising considerable amount of malt. The enzyme composition in raw cereals is substantially different from malted cereals and the endogenous and the exogenous enzymes involved in the degradation of starch are working together in a complex manner during mashing and it is generally assumed that some malt should be present in the grist. Thus even with exogenously added enzymes some of the above mentioned problems e.g. with filterability, fermentability and turbidity of worts based on unmalted cereals still exists. Consequently, very few attempts have been made to substitute larger amount or all of the malted cereals with unmalted cereals.

One example is Goode et. al. describing the production of a wort from 100% raw barley substrate and an enzyme blend of two different alpha-amylases and a beta-glucanase. Alpha amylase has a positive effect on mash separation, but the speed of filtration dropped when high amounts of unmalted barley were present. Also in U.S. Pat. No. 3,081,172 producing a wort from unmalted raw material is suggested however nothing is mentioned about FAN (Free Amino Nitrogen), the amount of fermentable sugars and other crucial parameters of the resulting wort.

Consequently, problems such as low fermentability, non optimal amino acids composition and high viscosity and turbidity of the wort are not solved and these obstacles tend to increase with increasingly amounts of unmalted cereals.

Another disadvantages with the prior art brewing with unmalted cereals is that prolonged mashing time may be needed in order for the exogenous and endogenous enzymes in the mash produce a wort which is comparable e.g. with regards to fermentability to a wort produced from malted cereals. The prolonged mashing time is clearly uneconomic and may neutralize the economical advantages of substituting malted with unmalted cereals.

Thus until now no enzyme blend has fully compensated the malt enzymes, such that it when adding together with up to 100% unmalted cereals could fully substitute for a grist based on malted cereals.

Thus even though producing wort from barley has been attempted since the late 1960 no real brewing process based on raw material from high amount of unmalted cereals has been developed.

In the light of a desire to reduce the costs related to malting of cereals, and further to obtain a wort suitable for producing a beer comparable in taste characteristics to traditional beers, there exists a need for a method to obtain a mash based on up to 100% unmalted cereals. The process should be easily adaptable to the brewing systems used in brewing based malted raw material. Thus the mash should be filterable and in addition other parameters such as the amino acid composition and amount of fermentable sugars should be comparable to mash based on the corresponding malted cereals even if the cereal(s) is/are 100% unmalted cereal(s). Finally, the mashing time should be comparable to that of mashing of malted raw material while still retaining the good characteristics e.g. the sugar profile of the mash and the beer product.

Thus, it is an object of the invention to develop a process for producing a wort from a grist comprising more than 70%, and even up to 100%, unmalted cereals.

SUMMARY OF THE INVENTION

The inventors of the present invention have surprisingly found that by addition of a suitable combination of exogenous enzymes to the mash, and by thermal activation/inactivation of endogenous enzymes, it is now possible to obtain a wort based on up to 100% unmalted cereals, such as barley.

A process for the production of a brewer's wort, comprising:
 a. obtaining a mash by mashing a grist, of which at least 70 wt % is unmalted cereal(s) comprising β-amylase activity and of which less than 30 wt % is malted cereal(s), at a temperature at which exogenous (added) enzymes and the endogenous β-amylase are active;
 b. contacting the mash with exogenous enzymes comprising:
  i. an α-amylase activity,
  ii. a pullulanase activity,
  iii. a proteolytic activity, and
  iv. a β-glucanase activity;
 c. mashing-off and filtering the mash to obtain the wort.

In a preferred embodiment, the unmalted cereal(s) are of the tribe Triticeae, e.g. barley, spelt, wheat, rye.

In another embodiment the unmalted cereal(s) are any unmalted cereal(s), such as but not limited to barley, spelt, wheat, rye, corn, oat or rice or any mixture thereof. Thus in another embodiment of the invention the grist comprises a mixture of unmalted cereals, such as but not limited to a mixture of unmalted barley and unmalted wheat, a mixture of unmalted rice and unmalted barley.

In one embodiment, the invention relates to a process, where the grist further comprises other carbohydrate sources, such as brewing syrups or any mixture thereof.

In another embodiment, the exogenous enzymes of step b. above further comprise a xylanase activity, a lipase activity, and/or a phytase activity.

In a preferred embodiment, the mashing temperature is in a range optimizing the β-amylase activity and reducing the lipoxygenase activity.

A preferred embodiment of the invention concerns a process where the pullulanase is thermostable having a relative enzyme activity above 60% over a period of 30 min, at 65° C. and at pH level 5.

In a further aspect, the invention relates to a wort produced by the process of the invention. Furthermore, the invention relates to the use of the wort for the production of beers of any type, e.g. light and dark lager types, light and dark ale types, wheat beers, all porter, stout, ice concentrated (eg. eisbock), barley wine types or happoushu.

In a further aspect, the wort produced according to the invention comprises one or more amino acids selected from
 a. proline at a concentration at less than 2 mM, preferably less than 1 mM, and most preferably less than 0.5 mM in the wort;
 b. serine at a concentration above 0.1 mM, preferably above 0.125 mM, and most preferably above 0.15 mM; and
 c. methionine at a concentration above 0.05 mM, preferably above 0.08 mM, and most preferably above 0.10 mM.

The invention further concerns an enzyme mixture comprising;
 i. an α-amylase activity,
 ii. a pullulanase activity, wherein the pullulanase is thermostable
 iii. a proteolytic activity, and
 iv. a β-glucanase activity;

In a particular embodiment the enzyme mixture comprising;
 i. an α-amylase activity,
 ii. a pullulanase activity,
 iii. a proteolytic activity,
 iv. a β-glucanase activity; and
 v. a xylanase activity.

In another embodiment the enzyme mixture further comprises lipase activity.

FIGURES

DEFINITIONS

Figure 1:
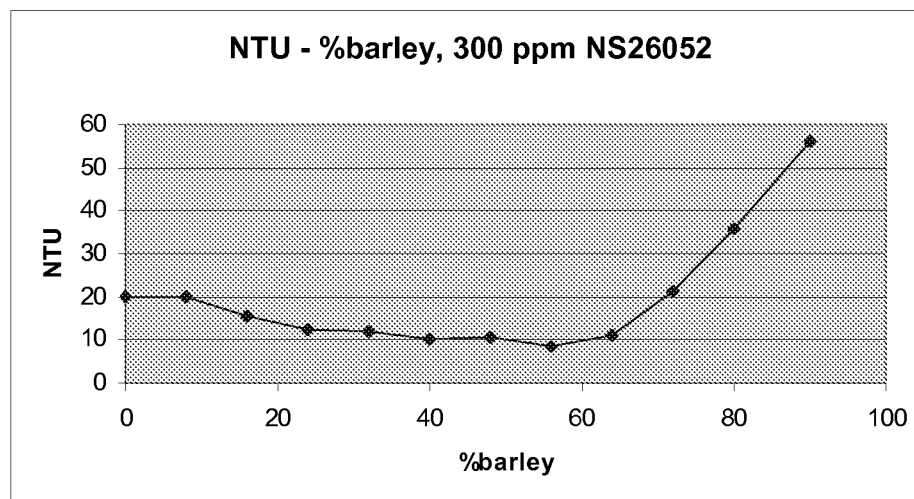
FIG. 1 shows the turbidity (NTU) of a wort produced from increasingly amount of barley when only Ultraflo Max is exogenously added.

Throughout this disclosure, various terms generally understood by persons skilled in the art are used. Several terms are used with specific meanings, however, and are meant as defined by the following.

The term "malting" is a process whereby grains are made to germinate and are then dried.

The term "malted grain" is understood as any cereal grain, in particular barley, which has been subjected to a malting process.

The term "unmalted grain" is understood as any cereal grain, in particular barley, which has not been subjected to a malting process. The terms unmalted and non-malted could be used interchangeably in the present context.

The term "grist" is understood as the starch-containing or sugar-containing material that is the basis for beer production. It may include malted and unmalted cereal as well as adjunct.

The term "cereals" is understood as grains which are any starch containing material used as raw material e.g. for production of beer such as, but not limited to, barley, wheat, sorghum, maize, rice, oat and rye. The cereals may be malted or unmalted.

The term "adjuncts" is usually understood as raw material which may be added to the main ingredient of the grist, which traditionally are malted cereals. Thus since the unmalted grains usually only comprises a small part of the grist, unmalted cereals is typically defined as an adjunct together with liquid carbohydrates such as sugars and sirups. The adjuncts could be either solid or liquid or both, where the solid part may be unmalted cereals, such as barley, corn and rice whereas the liquid part may be readily fermentable carbohydrates such as sugar and syrups.

In this context however, what might be regarded as adjunct may be the main ingredient. Thus unmalted cereals which in a traditional context are an adjunct may according to the present invention comprise 100% of the raw material.

Accordingly, unmalted cereals is usually comprised in the term adjunct however since the unmalted cereals preferably comprise more than 70% of the raw material and the malted cereals preferably is less than 30% of the raw material the terms are in this contexts most easily understood as:

The grist may comprise malted and unmalted cereals and adjuncts. Adjuncts are in this context understood as the part of the grist which is not malted or unmalted cereal. Thus the adjuncts according to the present invention are preferably the liquid part such as brewing syrups and sugars.

Whereas unmalted cereals is any cereal not malted, thus any starch containing grains such as, but not limited to, barley, corn, rice, rye, oats, sorghum and wheat. Accordingly grist from 100% unmalted grains may comprise unmalted barley and other non barley unmalted cereals such as rice and wheat.

In another embodiment of the invention the grist comprises a mixture of unmalted cereals, such as but not limited to a mixture of unmalted barley and unmalted wheat, a mixture of unmalted rice and unmalted barley. Thus the grist may comprise 50% unmalted barley and 50% unmalted other cereals, such as wheat and rice.

In a specially preferred embodiment of the invention the unmalted cereal(s) comprises more than 70% of the grist and the malted cereals comprise less than 30% of the grist.

The term "mash" is understood as a starch-containing slurry comprising crushed barley malt, other starch-containing material, or a combination thereof, steeped in water to make wort.

The term "mashing process" or mashing profile or simply mashing is understood as the process of combining grains with water and heating the mixture up with rests at certain temperatures to allow the enzymes in the mash to break down the starch in the grain into sugars, to create a wort.

"mashing off" or mashing out is when the temperature of the mash is raised. This frees up about 2% more starch, and makes the mash less viscous.

The term "wort" is understood as the unfermented liquor run-off following the extraction of the grist during mashing. The terms brewers wort and wort is used interchangeably through out the application.

The term "spent grains" is understood as the drained solids remaining when the grist has been extracted and the wort separated.

The term "beer" is here understood as a fermented wort.

The term "beer product" is here understood as comprising "mash", "wort", "spent grains" and "beer".

The term "DP1" means glucose.
The term "DP2" means maltose.
The term "DP3" means maltotriose.
The terms "DP4+" or "DP4/4+" mean dextrin, or maltooligosaccharides of a polymerization degree of 4 or higher.
The term "Fru" means fructose.
The term "RDF" means real degree of fermentation.
The term "FAN" means free amino nitrogen.
The term "Plato" (° P) means grams extract pr 100 g wort (gram extract/100 g wort).

DETAILED DESCRIPTION OF THE INVENTION

By the addition of a combination of exogenous enzymes, e.g. α-amylase, isoamylase/pullulanase, FAN generating activity (proteases) and filterability promoting activities (beta-glucanase and/or xylanase), to the mash and by the simultaneous thermal activation of the maltose-generating endogenous β-amylase, it is possible to obtain a wort based on up to even 100% unmalted cereal(s).

Thus, in a first aspect, the invention relates to a process for the production of a brewer's wort, comprising:
  a. obtaining a mash by mashing a grist, of which at least 70 wt % is unmalted cereal(s) comprising β-amylase activity and of which less than 30 wt % is malted cereal(s), at a temperature at which exogenous (added) enzymes and the endogenous β-amylase are active;
  b. contacting the mash with exogenous enzymes comprising:
    i. an α-amylase activity,
    ii. a pullulanase activity,
    iii. a proteolytic activity, and
    iv. a β-glucanase activity;
  c. mashing-off and filtering the mash to obtain the wort.

In a preferred aspect, the invention relates to a process, where the grist comprises at least 70 wt % unmalted cereal(s), such as at least 75 wt %, more preferably at least 80 wt %, more preferably at least 85 wt %, more preferably at least 86 wt %, more preferably at least 87 wt %, more preferably at least 88 wt %, more preferably at least 89 wt %, more preferably at least 90 wt %, more preferably at least 91 wt %, more preferably at least 92 wt %, more preferably at least 93 wt %, more preferably at least 94 wt %, more preferably at least 95 wt %, more preferably at least 96 wt %, more preferably at least 97 wt %, more preferably at least 98 wt %, even more preferably 99 wt %, and most preferably 100 wt % unmalted cereal(s).

It is to be understood that the at least 70 wt % unmalted cereal(s) may be one or more cereal(s) wherein at least one of the cereal(s) contain β-amylase activity.

In one aspect of the invention the grist comprises less than 30 wt % malted cereals, more preferably less than 25 wt %, more preferably less than 20 wt %, more preferably less than 15 wt %, more preferably less than 10 wt %, more preferably less than 5 wt % and even more preferably less than 3 wt %, and most preferably the grist comprises 0 wt % malted cereals.

In a preferred embodiment, the unmalted cereal(s) are of the tribe Triticeae. Preferred within this tribe are barley, spelt, wheat and rye. Triticeae is a tribe within the Pooideae subfamily of grasses that includes genera with many domesticated species, E A Kellogg, R Appels, R J Mason-Gamer— SYSTEMATIC BOTANY, 1996. Major crop genera are found in this tribe including wheat, barley, and rye. In another preferred embodiment the grist comprises unmalted cereals other than from the Triticeae tribe, such as but not limited to rice, corn, oat, sorghum.

In another preferred embodiment the unmalted cereal(s) are selected from the group comprising barley, spelt, wheat, rye, corn, oat or rice or any mixture thereof.

Thus in one embodiment, the invention relates to a process, where the grist further comprises of one or more additional unmalted cereal(s) such as corn grist, corn starch and rice. The grist may therefore comprise a mixture of unmalted cereals, such as but not limited to a mixture of unmalted barley and unmalted wheat or a mixture of unmalted rice and unmalted barley.

In a particular preferred embodiment of the invention the unmalted cereal is barley.

In yet another aspect the grist further comprises 0-50 wt % other carbohydrate sources, such as brewing syrups or any mixture thereof.

In another embodiment, the exogenous enzymes of step b. above further comprise a xylanase activity, preferably family GH10 (glycosyl hydrolase family 10) which may improve the filtration of wort and beer.

In another embodiment, the exogenous enzymes of step b. above further comprise a lipase activity, which may improve the wort filtration and reduce haze.

In another embodiment the exogenous enzymes of step b. above further comprise a phytase activity.

In another embodiment the exogenous enzymes of step b. above further comprise one or more of the following activities; a xylanase activity, a lipase activity, and/or a phytase activity.

In a preferred embodiment the mashing temperature, i.e. the temperature at which the exogenous (added) enzymes and the endogenous β-amylase are active, is in a range optimizing each of the different enzymes activity, at each heating step. The mashing process is preferably performed in three steps each optimized to the different enzymes. These steps may be referred to as enzyme rests or enzyme steps.

Thus a special embodiment of the invention concerns the temperature profile of a mashing process for producing a brewers wort, wherein A first step is carried out between 50 and 58° C.,
A second step is carried out between 60 and 65° C., and
A third step is carried out between 70 and 80° C.

The different enzymes in the mashing process both exogenous and endogenous have different temperature optimum and the mashing process may be run at different temperatures for a certain period of time in order to let the enzymes react. These periods is often referred to as enzyme rests.

In the first step, which might be termed the proteolytic step, the temperature is preferably within the range of optimising e.g. the proteolytic enzyme, the temperature is preferably between 45° C. and 58° C., such as preferably between 46° C. and 57° C., such as preferably between 47° C. and 56° C., such as preferably between 48° C. and 55° C., such as preferably between 49° C. and 54° C., such as preferably between 50° C. and 54° C., such as preferably between 51° C. and 54° C., such as preferably between 52° C. and 54° C., most preferably between 53° C. and 54° C., such as 54° C., In the second step the temperature is preferably within the range of optimising e.g. the starch converting enzymes, such as the β-amylase and pullulanase. This step is often referred to as the saccharification step and the temperature is preferably between 60° C. and 72° C., such as preferably between 60° C. and 70° C., such as preferably between 62° C. and 68° C., such as preferably between 63° C. and 67° C., such as preferably between 64° C. and 66° C., and most preferably between 64° C. and 65° C., such as 64° C.

In the third step, which also may be referred to as mashing off or mashing out, this frees up about 2% more starch, and makes the mash less viscous, allowing the lauter to process faster. The temperature of the mashing out is preferably between 72° C. and 82° C., such as preferably between 73° C. and 81° C., such as preferably between 74° C. and 80° C., such as preferably between 75° C. and 79° C., such as preferably between 76° C. and 78° C., most preferably the temperature is between 78° C.-80° C., such as 80° C.

Endogenous lipoxygenase is known to be a source of off-flavour, and in a preferred embodiment, the mashing temperature, in the first mashing step referred to above is in a range reducing the lipoxygenase activity with at least 50%, preferably 55%, preferably 60%, preferably 65%, preferably 70%, preferably 75%, preferably 80%, preferably 85% most preferably 90% relative to the activity at mashing at 54° C.

The invention further relates to an enzyme mixture comprising:
i. an α-amylase activity,
ii. a pullulanase activity, wherein the pullulanase is thermostable
iii. a proteolytic activity, and
iv. a β-glucanase activity;

or in another embodiment of the invention concerns an enzyme mixture comprising;
v. an α-amylase activity,
vi. a pullulanase activity,
vii. a proteolytic activity,
viii. a β-glucanase activity; and
ix. a xylanase activity.

The enzyme mixtures may further comprise lipase activity.

The terms enzyme mixture and enzyme blend are used interchangeably in through out the application. The terms are to be understood as a mixture or blend of different enzymes or enzyme activities. The enzymes in the mixture or blend may be added in any order or together. The enzymes if not added together could be added in any order and is not necessarily added in the order listed above.

The enzymes according to the invention could be added at anytime of the mashing or before mashing. Thus the enzymes may be added to the mash ingredients, e.g., the water and/or the grist before, during or after forming the mash. The enzymes may be added together or separately.

In a preferred aspect, the α-amylase activity is provided by an α-amylase of fungal origin, e.g. from *Aspergillus niger*, or bacterial origin, e.g. *Bacillus*. Thus the α-amylase might be a bacterial α-amylase variant having increased thermo stability at acidic pH and/or low $Ca^{2+}$ concentration. Preferably, the α-amylase activity in the mash is 0.1-1.0 KNU(S)/g, more preferably 0.2-0.4 KNU(S)/g, and most preferably 0.25-0.35 KNU(S)/g dry weight cereal(s). Preferably the α-amylase has at least 50%, more preferably at least 60%, more preferably at least 70%, more preferably at least 80%, preferably at least 85%, more preferably at least 90%, preferably at least 91%, preferably at least 92%, preferably at least 93%, preferably at least 94%, more preferably at least 95%, preferably at least 96%, preferably at least 97%, more preferably at least 98%, and most preferably at least 99% identity to the amino acid sequence shown in SEQ ID NO:1 (a variant of the *B. stearothermophilus* α-amylase with the mutations I181* G182* N193F, described in WO99/19467 and available as Termamyl® SC from Novozymes A/S).

In a preferred embodiment of the invention, the starch debranching activity is provided by a pullulanase. In another embodiment of the invention the debranching activity is provided by other debranching enzymes such as but not limited to an isoamylase or limit dextrinase. In a certain embodiment of the invention the debranching activity is provided by a mixture of debranching enzymes such as but not limited to a pullulanase and an isoamylase.

Thus in a preferred embodiment of the invention, a pullulanase (E.C. 3.2.1.41) enzyme activity is exogenously supplied and present in the mash. The pullulanase may be added to the mash ingredients, e.g., the water and/or the grist before, during or after forming the mash.

The pullulanases according to the present invention is preferably pullulanase from e.g. *Pyrococcus* or *Bacillus*, such as *Bacillus acidopullulyticus* e.g. the one described in *FEMS Microbiol. Letters* 115: 97-106, or pullulanase is available from Novozymes as Promozyme 400L and having the sequence showed in SEQ ID NO: 2. The pullulanase may also be from *Bacillus naganoencis*, or *Bacillus deramificans* e.g. such as derived from *Bacillus deramificans* (U.S. Pat. No. 5,736,375) and having the sequence showed in SEQ ID NO: 7. The pullulanase may also be an engineered pullulanases from, e.g. a *Bacillus* strain.

Other pullulanases may be derived from *Pyrococcus woesei* described in PCT/DK91/00219, or the pullulanase may be derived from *Fervidobacterium* sp. Ven 5 described in PCT/DK92/00079, or the pullulanase may be derived from *Thermococcus celer* described in PCT/DK95/00097, or the pullulanase may be derived from *Pyrodictium abyssei* described in PCT/DK95/00211, or the pullulanase may be derived from *Fervidobacterium pennavorans* described in PCT/DK95/00095, or the pullulanase may be derived from *Desulforococcus mucosus* described in PCT/DK95/00098.

Most preferably the pullulanase is derived from *Bacillus acidopullulyticus*. A preferred pullulanase enzyme to be used in the processes and/or compositions of the invention is a pullulanase having an amino acid sequence which is at least 50%, such as at least 55%, such as at least 60%, such as at least 65%, such as at least 66%, such as at least 70%, such as at least 75%, such as at least 80%, such as at least 85%, such as at least 86%, such as at least 87%, such as at least 88%, such as at least 89%, such as at least 90%, such as at least 91%, such as at least 92%, such as at least 93%, such as at least 94%, such as at least 95%, such as at least 96%, such as at least 97%, such as at least 98%, such as at least 99% or even 100% identical to the sequence shown in SEQ ID NO:8 (NS26062, PulC, from *Bacillus acidopullulyticus*); in particular when aligned using the Program Needle using Matrix: BLOSUM62; Gap initiation penalty: 10.0; Gap extension penalty: 0.5; Gapless Identity Matrix. The terms Pul C, NS26062 and pullulanase C is used interchangeably throughout the application. The pullulanase is added in dosage of 0.1 to 3 PUN/g DM, such as 0.2 to 2.9, such as 0.3 to 2.8, such as 0.3 o 2.7 such as 0.3 o 2.6 such as 0.3 to 2.5 such as 0.3 to 2.4, such as 0.3 to 2.3, such as 0.3 to 2.2, such as 0.3 to 2.1, such as 0.3 to 2.0, such as 0.3 to 1.9, such as 0.3 to 1.8, such as 0.3 to 1.7, such as 0.3 to 1.6, most preferably pullulanase is added in dosage such as 0.3 to 1.5, preferably 0.4 to 1.4, more preferably 0.5 to 1.3, more preferably 0.6 to 1.2, more preferably 0.7 to 1.1, more preferably 0.8 to 1.0, more preferably 0.9 to 1.0. In a particular embodiment of the invention the enzyme is added in 0.3 PUN/g DM, such as 0.4 PUN/g DM, such as 0.5 PUN/g DM in a particularly preferred embodiment of the invention the enzymes dose is not larger than 1 PUN/g DM. Preferably the isoamylase or/and pullulanase activity in the mash is 0.1-2.0 PUN/g, more preferably 0.5-1.0 PUN/)/g dry weight cereal(s).

The relative activity of the debranching enzymes, such as pullulanases, may vary considerably at different temperatures e.g. as demonstrated in example 2 of the application. The debranching enzymes are working together with the other enzymes in the mash, in particular the β-amylase, which is usually endogenous and the α-amylase which may be endogenous or exogenously added. Thus a preferred debranching enzyme according to the invention is an enzyme having high relative enzyme activity in the temperature range at which both the β-amylase and the α-amylase is active. The α-amylase is usually active at a higher temperature than the β-amylase and the saccharification step of the mashing process, the step where the starch is converted into fermentable sugars by α-amylase, β-amylase and a debranching enzyme, is preferably run at a high temperature, such as at least 63 C°. Thus the debranching enzyme according to the invention is preferably thermostable and thermoactive. The terms thermostable and thermo active is used interchangeably through out the application.

In this context a thermostable enzyme is an enzyme having a relative enzyme activity above 60% measured over a period of 30 min, at 65° C. and at pH level 5.

The relative activity, which in this context is the relative enzyme activity, is calculated by setting the highest activity to 100% (maximum) and setting the activities at other temperatures relative to the temperature maximum.

Thus preferably the debranching enzyme is a pullulanase and even more preferably the pullulanase activity is provided by a pullulanase which is thermostable having a relative enzyme activity above 60% over a period of 30 min, at 65° C. and at pH level 5. An example of a thermostable pullulanase is given in example 2.

In one embodiment the pullulanase relative enzyme activity is above 60%, such as above 61%, such as above 62%, such as above 63%, such as above 64%, such as above 65%, such as above 66%, such as above 67%, such as above 68%, such as above 69%, such as above 70%, such as above 71%, such as above 72%, such as above 73%, such as above 74%, such as above 75%, such as above 76%, such as above 77%, such as above 78%, such as above 79%, such as above 80%, such as above 81%, such as above 82%, such as above 83%, such as above 84%, such as above 85%, such as above 86%, such as above 87%, such as above 88%, such as above 89%, such as above 90%, such as above 91%, such as above 92%, such as above 93%, such as above 94%, such as above 95%, such as above 96%, such as above 97%, such as above 98%, such as above 99% and even 100% at 65° C., when measured over a period of 30 minutes, at pH 5.0.

In a particular preferred embodiment of the invention a thermostable pullulanase has a relative enzyme activity above 80% over a period of 30 min, at 65° C. and at pH level 5.

In a certain embodiment the pullulanase has above 80%, such as above 85%, such as above 90% such as above 95%, or even 100% remaining enzyme activity over a period of 30 min under mashing conditions with 12° P barley, at gelatinization temperature of unmalted barley, and at pH in the range of 5.6-6.2, compared to the activity before incubation at the gelatinization temperature of unmalted barley.

In another embodiment the protease activity is provided by a proteolytic enzymes system having a suitable FAN generation activity including endo-proteases, exopeptidases or any combination hereof, preferably a metallo-protease. Preferably the protease activity in the mash is 0.0005-0.002 AU/g, more preferably 0.001-0.0015 AU/g dry weight cereal(s). Preferably, the protease has at least 50%, more preferably at least 60%, more preferably at least 70%, more preferably at least 80%, more preferably at least 85%, more preferably at least 90%, more preferably at least 91%, more preferably at least 92%, more preferably at least 93%, more preferably at least 94%, more preferably at least 95% more preferably at least 96%, more preferably at least 97% more preferably at least 98%, and most preferably at least 99% or even 100% identity to the amino acid sequence shown in SEQ ID NO:3 (a metallo-protease from *Bacillus amyloliquefaciens*, described in WO9967370, available as Neutrase® from Novozymes A/S).

In a further embodiment, β-glucanase (E.C3.2.1.4.) activity is added to the mash. Preferably the β-glucanase activity in the mash is 0.1-1.5 FBG/g, such as 0.2-1.2 FBG/g, such as 0.4-1.0 FBG/g, such as 0.5-1.0 FBG/g dry weight cereal(s). β-glucanase is also termed cellulase and may be of fungal or bacterial origin. Such as from *Aspergillus oryzae, Aspergillus niger* or from bacillus such as *B subtilis*. The added β-glucanase activity may also origin from malt. In one particular preferred embodiment of the invention the β-glucanase is added together with xylanase in an enzyme blend termed Ultraflo Max. Ultraflo Max is an enzyme blend of Xylanase and β-glucanase, the blend is described in the application WO2005/059084 A1.

In another embodiment, the xylanase activity is provided by a xylanase from glycosyl hydrolase family 10. Preferably the xylanase activity in the mash is 0.02-0.1 FXU-S/g, more preferably 0.04-0.08 FXU-S/g dry weight cereal(s). Preferably, the xylanase has at least 50%, more preferably at least 60%, more preferably at least 70%, more preferably at least 80%, more preferably at least 85%, more preferably at least 90%, more preferably at least 91%, more preferably at least 92%, more preferably at least 93%, more preferably at least 94% more preferably at least 95%, more preferably at least 96%, more preferably at least 97% more preferably at least 98%, and most preferably at least 99% or even 100% identity to the amino acid sequence shown in SEQ ID NO:4 (described in WO 94/21785, available as Shearzyme® from Novozymes A/S).

In another embodiment, the lipase activity is provided by a lipase having activity to triglycerides and/or galactolipids and/or phospholipids. Preferably, the lipase activity is provided by a lipase from *Fusarium* (including *F. oxysporum* and *F. heterosporum*), *Aspergillus* (including *A. tubigensis*), *Rhizopus* (including *R. oryzae*) or *Thermomyces* (including *T. lanuginosus*) or a variant of these. An example is Lipopan X (Lipopan Xtra), a variant of the *Thermomyces lanuginosus* lipase with the substitutions G91A+D96W+E99K+P256V+G263Q+L264A+I265T+G266D+T267A+L269N+270A+271G+272G+273F (+274S), described in WO2004099400A2. Preferably, the lipase has at least 50%, more preferably at least 60%, more preferably at least 70%, more preferably at least 80%, more preferably at least 85%, more preferably at least 90%, more preferably at least 91%, more preferably at least 92%, more preferably at least 93%, more preferably at least 94%, more preferably at least 95%, more preferably at least 96%, more preferably at least 97% more preferably at least 98%, and most preferably at least 99% or even 100% identity to residues 1-316 or 1-273 of the amino acid sequence shown in SEQ ID NO:5 (lipase/phospholipase from *Fusarium oxysporum*, described in EP 869167, available from Novozymes A/S as Lipopan® F). Preferably, the lipase activity in the mash is 0-50 LU/g, such as 0-40 LU/g, such as 0-30 LU/g, such as 0-20 LU/g dry weight cereal(s). In a specially preferred embodiment of the invention the lipase is Lipozyme TL or lipolase, this lipase has a significantly good effect on filtration speed and haze reduction. Thus in a special preferred embodiment of the invention the lipase has at least 50%, more preferably at least 60%, more preferably at least 70%, more preferably at least 80%, more preferably at least 85%, more preferably at least 90%, more preferably at least 91%, more preferably at least 92%, more preferably at least 93%, more preferably at least 94%, more preferably at least 95%, more preferably at least 96%, more preferably at least 97% more preferably at least 98%, and most preferably at least 99% or even 100% identity to the amino acid sequence shown in SEQ ID NO 9. The lipase may also be Lipex, a variant of Lipozyme having at least 50%, more preferably at least 60%, more preferably at least 70%, more preferably at least 80%, more preferably at least 95%, more preferably at least 98%, and most preferably at least 99% or even 100% identity to the amino acid sequence shown in SEQ ID NO: 10. The lipases degrade the lipid from barley e.g. the triglycerids into partial glycerides and free fatty acids. This leads to a lower turbidity and much improved mash filtration and lautering properties.

In another embodiment, the phytase activity is provided by a phytase from *Aspergillus niger, Peniophora* or *Citrobacter*. Preferably, the phytase activity in the mash is 0-5 FYT/g, more preferably 0.5-1.5 FYT/g dry weight cereal(s). Preferably, the phytase has at least 50%, more preferably at least 60%, more preferably at least 70%, more preferably at least 80%, more preferably at least 85%, more preferably at least 90%, more preferably at least 91%, more preferably at least 92%, more preferably at least 93%, more preferably at least 94%, more preferably at least 95%, more preferably at least 96%, more preferably at least 97%, more preferably at least 98%, and most preferably at least 99% or even 100% identity to the amino acid sequence shown in SEQ ID NO:6 (a variant of *Peniophora lycii* phytase, described in WO 2003/066847).

In some embodiment of the invention Flavourzyme is added. Flavourzyme is an enzyme composition obtained from *A. oryzae* strain NN000562 originally obtained as ATCC 20386. FLAVOURZYME contains alkaline and acid protease activities.

In a further aspect, the invention relates to a wort produced by the process of the invention.

Furthermore, the invention relates to the use of the wort for the production of beers of any type, e.g. light and dark lager types, light and dark ale types, wheat beers, all porter, stout, ice concentrated (e.g. eisbock), barley wine types or happoushu.

The nitrogen containing components are important components of the wort because they affect the character of the beer, such as the taste and fermentation pattern. The nitrogen containing compounds are important nutrients for the yeast with the exception of proline which is hardly assimilated by the yeast thus it is favourable to have a small amount of proline or no proline in the wort. Thus in a further aspect, the wort comprises one or more amino acids selected from a. proline at a concentration at less than 2 mM, preferably less than 1 mM, and most preferably less than 0.5 mM in the wort;

b. serine at a concentration above 0.1 mM, preferably above 0.125 mM, and most preferably above 0-15 mM; and c. methionine at a concentration above 0.05 mM, preferably above 0.08 mM, and most preferably above 0.10 mM.

Thus in one aspect the proline concentration is below 2 mM, such as below 1.5 mM, such as below 1 mM, such as below 0.5 mM, such as below 0.25 mM.

In another aspect the serine concentration is above 0.1 mM, such as 0.125 mM, such as 0.15 mM, such as 0.2 mM.

In another aspect the methionine concentration is above 0.005 mM, such as 0.008 mM, such as 0.1 mM, such as 0.125 mM, such as 0.15 mM.

The inventors has surprisingly found that even with very high amounts e.g. above 80% of unmalted cereals such as unmalted barley a wort could be produced which has a high amount of fermentable sugars, which in this context is DP1-DP3 (glucose, maltose and maltotriose) and in a particular preferred aspect of the invention the amount of maltose is high compared to the amount of glucose, which is favorable because it prevents osmotic pressure on the yeast and regulates the ester production and therefore the flavour and aroma profile of the final beer.

Thus one aspect if the invention concerns a wort, where the maltose concentration is above 45%, preferably above 50%, preferably above 55%, preferably above 56%, preferably above 57%, preferably above 58%, preferably above 59%, preferably above 60%, preferably above 61%, preferably above 62%, preferably above 63%, preferably above 64%, preferably above 65%, most preferably the maltose concentration is above 70% of the total concentration of carbohydrates.

In another aspect the invention concerns a wort where the glucose concentration is below 10%, preferably below 9%, preferably below 8%, preferably below 7%, preferably below 6%, preferably below 5% most preferably below 4%.

Yet another aspect of the invention concerns a wort according to any of the proceeding claims where the total of the glucose, maltose and maltotriose concentration is above 50%, preferably above 55%, preferably above 60%, preferably above 61%, preferably above 62%, preferably above 63%, preferably above 64%, preferably above 65%, preferably above 66%, preferably above 67%, preferably above 68%, preferably above 69%, preferably above 70%, preferably above 71%, preferably above 72%, preferably above 73%, preferably above 74%, preferably above 75%, preferably above 76%, preferably above 77%, preferably above 78%, preferably above 79% and preferably above 80% of the total concentration of carbohydrates.

RDF (Real degree of fermentation) is calculated as RDF %=100*(OE % P−ER %)/OE % P whereas OE means Original Extract in % P and ER means Real Extract % P measured by a densitometer (Analytica EBC reference).

Thus in one aspect of the invention the RDF in the wort is more than 60%, such as at least 65%, such as at least 70%, such as at least 75%, such as at least 76%, such as at least 77%, such as at least 78%, such as at least 79%, such as at least 80%, such as at least 81%, such as at least 82%, such as at least 83%, such as at least 84%, such as at least 85%, such as at least 86%, such as at least 87%, such as at least 88%, such as at least 89%, such as at least 90%, such as at least 91%, such as at least 92%, such as at least 93%, such as at least 94%, such as at least 95%, such as at least 96%, such as at least 97%, such as at least 98%, such as at least 99%, such as at least 100%.

Some breweries add brewery syrup, e.g. high maltose, brewing syrup to the wort kettle which may increase the amount of fermentable sugars. However, though brewing syrup may be added according to the invention this is not necessary for increasing the amount of fermentable sugars or RDF.

In another embodiment of the invention concerns a process, wherein the ratio of maltose:glucose in the wort is higher than 5:1, such as higher than 6:1, such as higher than 7:1, preferably higher than 8:1, preferably higher than 9:1, preferably higher than 10:1, preferably higher than 11:1 in a particular preferred embodiment the ratio of maltose:glucose in the wort is higher than 12:1.

During the mashing process starch is degraded into fermentable and unfermentable sugars and the proteinous material is converted the free amino acids which is used by the yeast. According to the invention the raw material used for mashing can be up to 100% unmalted cereals, such as unmalted barley without reducing the fermentability of the wort or reducing the amount of amino acids available for the yeast.

In addition, brewing on unmalted cereals may give problems with filterability due to excess of non converted starch and β-glucan or xylan, which may also cause haze of the beer. Adding filtration aiding enzymes such as β-glucanase may increase the filterability of the wort. However, when unmalted cereal comprises main part of the grist, β-glucanase alone is not enough provide filterable wort.

The inventors have surprisingly found that adding exogenous enzymes according to the invention, comprising α-amylase activity, pullulanase activity, proteolytic activity, lipase activity and β-glucanase activity; to the mash prepared from a grist comprising at least 70% unmalted cereal(s) produced a wort which is comparable or even better with regards to e.g. FAN, fermentable sugars (DP1-DP3) and which is filterable and also have an acceptable low turbidity when compared to a wort produced from a malted grist.

The lauter tun time, the time is takes to filter the mash in the lauter tun, if this is in a separate vessel, is influenced e.g. by the turbidity. Thus in a certain aspect of the invention the wort is filterable and has a low turbidity and in one embodiment of the invention the turbidity is below 20 NTU (The units of turbidity from a calibrated nephelometer, Nephelometric Turbidity Units), such below 19 NTU, such below 18 NTU, such below 17 NTU, such below 16 NTU, such below 15 NTU, such below 14 NTU, such below 13 NTU, such below 12 NTU, such below 11 NTU, such below 10 NTU.

One way of increasing the amount of fermentable sugars is by increasing the mashing time e.g. by increasing the saccharification step. However, in another important aspect of the invention the mashing time needed for producing a wort which is highly fermentable is not increased compared to the mashing time for producing an equally fermentable wort based on the same amount of malt.

This is surprising since generally longer mashing time is needed when the mash is based on high amount unmalted cereals e.g. 70% barley to give the same fermentability and FAN as in a wort produced on corresponding amounts (70%) of malt.

Thus in a particular embodiment of the invention the mashing process is completed within 160 minutes, preferably within 120 minutes.

In one embodiment of the invention the mashing process comprising all the enzymes rests and all heating steps, is completed within 180 minutes, such as within 170 minutes, such as within 160 minutes, such as within 155 minutes, such as within 150 minutes, such as within 145 minutes, such as within 140 minutes, such as within 135 minutes, such as within 130 minutes, such as within 125 minutes, such as within 120 minutes, such as within 115 minutes, such as within 110 minutes, such as within 105 minutes, such as within 100 minutes, such as within 95 minutes, such as within 90 minutes, such as within 85 minutes, such as within 80 minutes, such as within 75 minutes, such as within 70 minutes, such as within 65 minutes, such as within 60 minutes.

When malt is substituted with grains such as rice and corn the grist may need to be treated by decoction or decoction mashing or adjunct decoction, which is process where a proportion of the grains are boiled separately with thermostable α-amylase and then returned to the mash. This process is often needed for these types of grains as the gelatinization temperature is higher than for barley, malt, and e.g. wheat. Thus pregelatinization is needed to make the starch accessible for all the needed endogenous and added enzymes. The process may also be used to give a malty flavor to the beer.

Unmalted cereals, such as barley shows a general different behaviour in milling than malted cereals, as an example barley has higher water content, is unmodified and is much harder than malt.

To run a lauter tun with malt and achieve an acceptable performance (yield and lauter time) a certain grist composition is necessary, the grist composition can be measured by a sieving test.

The grist composition made by roller mills are mainly influenced by the gap between the roller pair(s) (two roller mill=one pair, four roller mill=two pair). The first pair has always a wider gap than the second one. In order to obtain a lauter performance compared to a grist made of malt the inventors has changed, these roller gap(s).

The inventors found that a four roller mill and a six roller mill (three pairs) could mill with adjusted roller gaps are well suited to mill the barley into usable grist. This is important since a good lauter performances only can be achieved with an optimized grist composition that is different to the optimal grist composition of malt.

The sieving test was performed according to the sieving test described in Anger, H.: MEBAK Band Rohstoffe. 1. Auflage Brautechnische Analysenmethoden. 2006, Freising: Selbstverlag der MEBAK.

TABLE 1

Milled barley compared to malt

|  | Barley | Malt |
| --- | --- | --- |
| Sieve 1 | 25% | 18% |
| Sieve 2 | 15% | 8% |
| Sieve 3 | 38% | 33% |
| Sieve 4 | 10% | 21% |
| Sieve 5 | 3% | 10% |
| Bottom | 9% | 11% |

The results show that for a successful 100% barley lauter performance more coarse grist with more focus on sieve 1-3 leads to a good lauter performance. It could also be seen that the barley grist is significantly different from the grist from malt.

EXAMPLES

Materials and Methods
Enzymes
Alpha-Amylase Activity (KNU)

The amylolytic activity may be determined by using potato starch as substrate. This method is based on the break-down of modified potato starch by the enzyme, and the reaction is followed by mixing samples of the starch/enzyme solution with an iodine solution. Initially, a blackish-blue color is formed, however, during the break-down of the starch the blue color gets weaker and gradually turns into a reddish-brown, which is compared to a colored glass standard.

One Kilo Novo alpha amylase Unit (KNU) equals 1000 NU. One KNU is defined as the amount of enzyme which, under standard conditions (i.e. at 37° C.+/−0.05; 0.0003 M $Ca^{2+}$; and pH 5.6) convert 5.26 g starch dry substance (Merck Amylum solubile) into dextrins sufficiently small not to make a colour reaction with iodine Debranching Activity (PUN)

Pullulanase activity may be determined relative to a pullulan substrate. Pullulan is a linear D-glucose polymer consisting substantially of maltotriosyl units joined by 1,6-alpha-links. Endopullulanases hydrolyze the 1,6-α-links at random, releasing maltotriose, $6^3$-alpha-maltotriosyl-maltotriose, $6^3$-alpha-($6^3$-alpha-maltotriosyl-maltotriosyl)-maltotriose, etc. the number of links hydrolyzed is determined as reducing carbohydrate using a modified Somogyi-Nelson method.

One pullulanase unit (PUN) is the amount of enzyme which, under standard conditions (i.e. after 30 minutes reaction time at 40° C. and pH 5.0; and with 0.2% pullulan as substrate) hydrolyzes pullulan, liberating reducing carbohydrate with a reducing power equivalent to 1 micromol glucose per minute.

Proteolytic Activity (AU)

The proteolytic activity may be determined by using denatured hemoglobin as substrate. In the Anson-Hemoglobin method for the determination of proteolytic activity, denatured hemoglobin is digested, and the undigested hemoglobin is precipitated with trichloroacetic acid (TCA). The amount of the TCA soluble product is determined by using phenol reagent, which gives a blue color with tyrosine and tryptophan.

One Anson Unit (AU) is defined as the amount of enzyme which under standard conditions (i.e. 25° C., pH 7.5 and 10 min. reaction time) digests hemoglobin at an initial rate such that there is liberated an amount of TCA soluble product per minute which gives the same colour with phenol reagent as one milliequivalent of tyrosine.

β-Glucanase Activity (FBG)

One fungal beta glucanase unit (FBG) is the amount of enzyme, which, according to the standard conditions outlined below, releases reducible oligosaccharides or reduces carbohydrate with a reduction capacity equivalent to 1 mol glucose per minute.

Fungal beta glucanase reacts with beta glucan during the formation process to glucose or reducing carbohydrate which is determined as reducing sugar according to the Somogyi Nelson method.

The sample should be diluted to give an activity between 0.02~0.10 FBG/ml. The standard reaction conditions are: Substrate: 0.5% barley beta glucan, temperature: 30° C., pH: 5.0 and the reaction time 30 min.

However the cellulytic activity in the commercial product is measured in endoglucanase units (EGU), which can be converted to FBG. For celluclast the EGU can be converted to FBG by multiplying the EGU by a factor 3.2.

Xylanase (FXU(S))

The xylanolytic activity can be expressed in FXU(S)-units, determined at pH 6.0 with remazol-xylan (4-O-methyl-D-glucurono-D-xylan dyed with Remazol Brilliant Blue R, Fluka) as substrate.

An xylanase sample is incubated with the remazol-xylan substrate. The background of non-degraded dyed substrate is precipitated by ethanol. The remaining blue colour in the supernatant (as determined spectrophotometrically at 585 nm) is proportional to the xylanase activity, and the xylanase units are then determined relatively to an enzyme standard at standard reaction conditions, i.e. Substrate concentration 0.45% w/v, Enzyme concentration 0.04-0.14 FXU(S)/mL at 50.0° C., pH 6.0, and in 30 minutes reaction time. Xylanase activity in FXU(S) is measured relative to a Novozymes FXU(S) enzyme standard (obtainable from Novozymes), comprising the monocomponent xylanase preparation Shearzyme from *Aspergillus aculeatus*.

Lipase (LU)

One Lipase Unit (LU) is the amount of enzyme which liberates 1 micromol of titrable butyric acid per minute at 30.0° C.; pH 7.0; with Gum Arabic as emulsifier and tributyrine as substrate.

Phytase (FYT)

One phytase unit (FYT) is the amount of enzyme which liberates 1 micro-mol of inorganic ortho-phosphate per min. under the following conditions: pH 5.5; temperature 37° C.; substrate: sodium phytate ($C_6H_6O_{24}P_6Na_{12}$) at a concentration of 0.0050 mol/l.

Leucine Amino Peptidase Unit (LAPU)

1 Leucine Amino Peptidase Unit (LAPU) is the amount of enzyme, which decomposes 1 micro-M substrate per minute at the following conditions: 26 mM of L-leucine-p-nitroanilide as substrate, 0.1 M Tris buffer (pH 8.0), 40° C., 10 minutes reaction time.

Laboratory Mashing Method

Unless stated otherwise, the mashing method used in the examples was performed as follows:

First, barley is milled to fine grist (Bühler Unirvisale gab 0.2 mm), then 50 g milled barley is added to a mashing cup and 200 g pre heated water (with calcium chloride) is added. The cup is placed in the mashing bath (Lochner LB 12 Electronic with 12 cups), the mashing diagram is set (e.g. mashing-in at 50° C. or 54° C., keep temperature for 20-30 minutes, increase by 1° C./minute to 64° C., keep for 40-60 minutes, increase by 1° C./minute 78 or 80° C., keep for 10-20 minutes and reduce temperature to 20° C.). The enzyme solution is added at the start to the cups and the mashing is initiated giving a total mashing period of 140-160 minutes. After mashing water is added to a total of 300 g in the cup and the mash is filtered with a Whatman 597½ (Schleicher & Schuell) folded filter to obtain the wort, where after the wort can be analyzed.

The wort sugar/dextrin (carbonhydrate) concentrations were analyzed in a Waters HPLC system (Novozymes method: 345-SM-2004.01/01) with pre-column (Cation H refill cat. 1250129) two column BoiRad Aminex HPX 87 H heated to 60° C. and flow of 0.4 ml/minutes with RI detection (Waters 2410 RI detector).

RDF: Real Degree of Fermentation, was determined by the method described in MEBAK method: 2.9.2. Principal: Reduction of wort dry matter, in %, by fermentation to alcohol and CO2

NTU: Haze in wort was analyzed by MEBAK method 2.15.1

In general the enzyme doses are calculated as follows:

Enzyme dosage in the target dosage

| Enzyme | Target dosage/g dm | Specific activity | g enzyme protein (EP)/1000 kg barley dm. |
|---|---|---|---|
| Termamyl SC | 0.3 KNU(S)/g | 43 KNU(S)/mg | 6.98 g |
| Ultraflo Max | 300 ppm | 4000 EGU/g total protein | 52.5 g |
|  |  | 30 FXU/mg | 2.5 g |
| Pullulanase NS26062 | 1.0 PUN/g | 57 PUN(G)/mg | 17.54 g |
| Neutrase | 0.001 AU/g | 60 AU/g | 33.3 g |
| Lipozyme TL | 20 LU/g | 6100 LU/mg | 3.28 g |

Example 1

The purpose of this example was to select the best suitable pullulanase for the production of wort based on RDF and DP2 (maltose). A grist comprising 100% unmalted barley was prepared as described above.

All cups were then added 50 ppm $Na_2SO_3$ and the enzymes:

α-amylase (Termamyl SC): 0.3 KNU(S)/g,

β-glucanase and xylanase (Ultraflo Max/Viscoflow XL): 300 ppm,

Protease (Neutrase 0.8) 0.002 AU/g,

Flavourzyme™ 1000 L: 0.1 LAPU/g, and

Pullulanase as described in Table 2:

The mashing was performed and the cups were added city water to a total of 300 g after mashing. The mash was filtered, and the results in Table 1 below were obtained by analyzing the wort:

TABLE 1

| 100% barley: RDF, % and wort sugar. | | | |
|---|---|---|---|
| Enzyme dosage PUN/g | DP2 % of total | DP4+ % of total | RDF % |
| — | 0.00 | 48.7 | 33.2 | 62.0 |
| Promozyme | 0.1 | 49.4 | 31.6 | 64.0 |
| Promozyme | 0.2 | 49.7 | 30.6 | 65.0 |
| Promozyme | 0.3 | 50.3* | 29.6* | 65.8* |
| Promozyme | 0.5 | 51.6 | 27.6 | 67.0 |
| — | 0.00 | 48.7 | 33.2 | 62.0 |
| NS26062 | 0.1 | 50.0 | 30.2 | 64.6 |
| NS26062 | 0.2 | 50.8 | 28.4 | 66.1 |
| NS26062 | 0.3 | 51.3* | 27.3* | 67.3* |
| NS26062 | 0.5 | 52.4 | 25.0 | 69.5 |

*Estimated by linear regression

The RDF is above 60% with both pullulanases, however RDF is a higher when NS26062 (PUL C) is added. The amount of maltose (DP2) relative to the amount of dextrins (DP4) was also higher for both pullulanase but again the amount of maltose relative to dextrins are higher for NS26062 (PUL C). Thus in conclusion: NS26062 (pullulanase C or PulC) showed the best performance, compared to Promozyme (promozyme 400 L) on PUN activity, on RDF % and maltose (DP2) generation. In this experiment the advantage of the thermostable NS26062 (pullulanase C or PULC) is clearly demonstrated.

Example 2

The following example demonstrates the different temperature optimum and the relative activity at different temperatures. The relative enzyme activity of three different pullulanases was analysed. The method of analyzing pullulanase activity is by detection of increased reducing sugar capacity (Somogyi-Nelson reacition) in the following conditions:

Substrate: 0.2% pullulan, pH 5.0, reaction time 30 minutes, stop of enzyme reaction by adding Somogyi copper reagent, followed by Nelson color reagent and boiling in 20 minutes. Samples were incubated at 30° C., 45° C., 55° C., 60° C., 62.5° C., 65° C., and 70° C. in 30 minutes. The samples were analyzed by spectrophotometer at OD520 nm, and the difference between sample and blank (increased by enzyme activity) were used in calculation of the results.

The highest activity was set to 100% (maximum) and activities at other temperatures set relative to the temperature maximum.

TABLE 2

Relative activity of different pullulanases at different temperatures

| Temperature In 30 minutes | PulC/NS26062 % | Promozyme 400 L % | Promozyme D2/ Optimax 1000 L % |
|---|---|---|---|
| 30° C. | 19.7 | 20.1 | 34.4 |
| 45° C. | 47.3 | 56.8 | 68.1 |
| 55° C. | 76.8 | 100.0 | 100.0 |
| 60° C. | 86.8 | 87.9 | 80.0 |
| 62.5° C. | 92.8 | 76.9 | 58.4 |
| 65° C. | 100.0 | 37.2 | 51.1 |
| 70° C. | 75.6 | 8.3 | 11.9 |

This example clearly demonstrates that Pul C is the most thermostable and thermoactive of the three pullulanase since it has a significant higher relative activity above 62.5° C. and since the highest activity measured over 30 minutes at 65° C. The Pul C pullulanase have highest activity of all three pullulanase between 62.5° C. and 65° C., which is the preferred temperature for mashing thus using Pul C as debranching enzyme in a mashing process, is clearly advantageous.

Example 3

The purpose of this experiment was to evaluate the effective dosage enzyme protein (EP) per g dm (gram dry matter) of 3 of different pullulanases (NS26062/PulC, Promozyme 400 L and Promozyme D2 (Optimax 1000 L) in saccharification of either 100% unmalted barley or 100% malted barley when applied in infusion mashing for 2 hours.

All cups were added enzymes blend 2 kg/1000 kg barley:
α-amylase (Termamyl SC) 0.3 KNU(S)/g,
β-glucanase and xylanase (Ultraflo MaxNiscoflow XL) 300 ppm,
Protease (Neutrase) 0.001 AU/g,
Lipase (Lipozyme TL 20 LU/g)
Different pullulanases dosages were added.
Specific activity:
NS26062: 57 PUN/mg EP.
Promozyme 400 L: 136 PUN/mg EP
Promozyme D2: 236 NPUN/mg EP
Iso-amylase from Hayashibara Co Ltd: Specific activity unknown The specific activities were measured after the pullulanases were purified by standard chromatographic techniques Mashing conditions: 54° C. in 30 minutes, increase to 64° C. in 10 minutes and maintain 45 minutes, increase to 80° C. in 16 minutes and maintain 10 minutes, producing wort with 12.6 Plato.

TABLE 3

Pullulanase effect on degradation of dextrin in 100% unmalted barley mashing: showing % of non fermentable carbohydrate in wort (dextrin/DP4+) with different dosages (g (gram) EP (enzyme protein)/1000 kg unmalted barley. Some experiments were done several times.

| gEP/1000 kg dm unmalted barley | NS26062 PulC | Promozyme 400 L | Promozyme D2 | Iso-amylase Hayashibara |
|---|---|---|---|---|
| 0 (control) | 30.5-30.8% | 30.5-30.8% | 30.5-30.8% | 30.5-30.8% |
| 8.77 | 20.1-21.4% 22.3% | — | — | — |
| 17.5 | 15.4-18.8% 17.9-18.3% | 19.8-20.4% | 27.4-27.5% | — |
| 26.3 | 13.6-16.1% 16.0-16.7% | — | — | — |
| 35.0 | 14.9-15.5% | 17.1% | — | — |
| 52.5 | 13.2% | — | — | — |
| 87.5 | — | 13.2-13.7% | 21.9-22.4% | — |
| 175 | — | 11.8-12.3% | 18.7-19.3% | — |

Table 3 shows that all three pullulanases but not the Hayashibara isoamylase could reduce the amount of non-fermentable sugars (dextrin DP4+) and thereby increase the amount of fermentable sugars. However, the best performing is clearly the NS26062 (Pul C) pullulanase, which reduced the amount of non-fermentable sugars relative to the amount of added enzymes much more than the Pullulanase 400 L and the pullulanase D2. This is a clear demonstration of the advantage of using the thermostable PulC. It is furthermore demonstrated that a DP4+ of less than 20%, corresponding to more than 80% glucose, maltose and maltotriose can be reached in 120 minutes of mashing.

Thus the choice of pullulanase is important for controlling the amount of fermentable sugars and for probably reduction of the non fermentable DP4+ dextrins. This is important since a good sugar profile (many fermentable sugars compared to non fermentable sugars) promote a good fermentation of the wort.

Example 4

The purpose of this example was to evaluate the effect of the pullulanase NS26062 on the DP2 (maltose) formation in the wort. A grist comprising 100% unmalted barley was prepared as described above.

All cups were then added 50 ppm $Na_2SO_3$+3.0 ml 1 M $H_3PO_4$ and enzymes:
α-amylase (Termamyl SC): 0.3 KNU(S)/g,
β-glucanase and xylanase (Ultraflo Max/Viscoflow XL): 300 ppm~0.23 EGU/g,
Protease (Neutrase 0.8 L): 0.002 AU/g,
Pullulanases as described in Table 4:

The mashing was performed and the cups were added city water to a total of 300 g after mashing. The mash was filtered, and the results in Table 4 below were obtained by analyzing the wort:

TABLE 4

100% barley: RDF, % and wort sugar.

| Enzyme dosage PUN/g (NS26062) | | DP1 % of total | DP2 % of total | DP4+ % of total | RDF % |
|---|---|---|---|---|---|
| — | 0 | 3.8 | 47.5 | 34.0 | 61.2 |
| NS26062 | 0.1 | 3.8 | 48.2 | 32.0 | 63.2 |
| NS26062 | 0.3 | 3.8 | 49.8 | 28.8 | 65.7 |
| NS26062 | 0.5 | 3.7 | 51.2 | 26.4 | 68.6 |
| NS26062 | 1 | 3.7 | 52.6 | 23.9 | 71.0 |
| NS26062 | 2 | 3.6 | 55.6 | 20.1 | 74.3 |

The maltose concentration (DP2) was increased by increasing the dosage of NS26062 (Pul C), and the increase in maltose % was followed by an increase in attenuation (RDF %). The dextrin fraction (HPLC analysis DP4/4+) was at the same time decreasing.

Only barley β-amylase could produce maltose in this reaction, and NS26062 (Pul C) facilitated the action of the barley beta-amylase.

Thus the NS26062 (Pul C) was a suitable pullulanase, providing a wort with high RDF and low glucose.

Example 5

The purpose of this example was to evaluate the three proteases Neutrase 0.8 L, Alcalase and Flavourzyme for FAN development and maltose formation. A grist comprising 100% unmalted barley was prepared as described above. Then all cups (trials 1-3 below) were added enzymes as indicated in the tables 5-7 below. The mashing was performed and the cups were added city water to a total of 300 g after mashing. The mash was filtered, and the results in the tables 5-7 were obtained by analyzing the wort:

Trial 1:
All samples were added: α-amylase (Termamyl SC): 0.3 KNU(S)/g, β-glucanase and xylanase (Ultraflo Max): 300 ppm (0.23 EGU/g) and different activities of the proteases Alcalase and Neutrase 0.8 L as indicated in table 5.

TABLE 5

FAN and % wort sugar at different dosages of Alcalase and Neutrase 0.8 L (enzyme activity per g dm mash)

| Cup no. | Alcalase AU/g | Neutrase 0.8 L AU/g | FAN mg/l/Plato | DP2 % of total | DP4/4+ % of total |
|---|---|---|---|---|---|
| 1 | — | — | 5.05 | 42.2 | 37.4 |
| 2 | — | 0.0005 | 6.73 | 45.4 | 35.5 |
| 3 | — | 0.001 | 7.32 | 44.6 | 35.8 |
| 4 | — | 0.0015 | 7.92 | 46.5 | 34.4 |
| 5 | — | 0.002 | 8.33 | 46.0 | 34.7 |
| 6 | — | 0.003 | 9.00 | 46.1 | 34.6 |
| 7 | 0.001 | 0.002 | 8.59 | 46.1 | 34.6 |
| 8 | 0.002 | 0.002 | 8.38 | 45.9 | 34.7 |
| 9 | 0.0025 | 0.002 | 8.35 | 46.5 | 34.3 |
| 10 | 0.003 | 0.002 | 8.59 | 46.9 | 34.1 |
| 11 | 0.004 | 0.002 | 8.92 | 46.6 | 34.2 |
| 12 | 0.005 | 0.002 | 9.29 | 47.1 | 34.0 |

Trial 2:
All samples were added: α-amylase (Termamyl SC): 0.3 KNU(S)/g, β-glucanase and xylanase (Ultraflo Max): 300 ppm (0.23 EGU/g), Flavourzyme: 0.1 LAPU/g, and the proteases Alcalase and/or Neutrase 0.8 L as indicated in table 6.

TABLE 6

FAN and % wort sugar at different dosages of Alcalase and Neutrase 0.8 L (enzyme activity per g dm mash)

| Cup no. | Alcalase AU/g | Neutrase 0.8 L AU/g | FAN mg/l/Plato | DP2 % of total | DP4/4+ % of total |
|---|---|---|---|---|---|
| 1 | — | — | 5.47 | 43.8 | 36.0 |
| 2 | — | 0.0005 | 6.75 | 46.4 | 34.3 |
| 3 | — | 0.001 | 7.20 | 47.5 | 33.7 |
| 4 | — | 0.0015 | 7.57 | 47.1 | 33.8 |
| 5 | — | 0.002 | 8.26 | 47.3 | 33.7 |
| 6 | — | 0.003 | 8.64 | 47.3 | 33.6 |
| 7 | 0.001 | 0.002 | 9.09 | 47.1 | 33.9 |
| 8 | 0.002 | 0.002 | 8.46 | 48.2 | 33.1 |
| 9 | 0.0025 | 0.002 | 8.64 | 47.9 | 33.4 |
| 10 | 0.003 | 0.002 | 8.49 | 47.3 | 33.8 |
| 11 | 0.004 | 0.002 | 8.96 | 47.5 | 33.6 |
| 12 | 0.005 | 0.002 | 10.15 | 47.4 | 33.7 |

Trial 3:
All samples were added: α-amylase (Termamyl SC): 0.3 KNU(S)/g, β-glucanase and xylanase (Ultraflo Max): 300 ppm 0.23 EGU/g, Flavourzyme: 0.1 LAPU/g, and the proteases Alcalase or Neutrase 0.8 L as indicated in table 7.

TABLE 7

FAN and % wort sugar at different dosages of Alcalase and Neutrase 0.8 L (enzyme activity per g dm mash)

| Cup no. | Alcalase AU/g | Neutrase 0.8 L AU/g | FAN mg/l/Plato | DP2 % of total | DP4/4+ % of total |
|---|---|---|---|---|---|
| 1 | — | — | 5.24 | 44.8 | 35.3 |
| 2 | 0.001 | — | 5.37 | 44.8 | 35.3 |
| 3 | 0.002 | — | 5.02 | 44.6 | 35.4 |
| 4 | 0.0025 | — | 5.20 | 45.7 | 34.6 |
| 5 | 0.003 | — | 5.29 | 44.2 | 35.7 |
| 6 | 0.004 | — | 5.66 | 44.4 | 35.0 |
| 7 | 0.005 | — | 5.91 | 45.0 | 35.0 |
| 8 | — | 0.002 | 5.66 | 44.4 | 35.5 |
| 9 | 0.004 | 0.001 | 8.45 | 47.1 | 33.9 |
| 10 | 0.004 | 0.0015 | 8.96 | 47.7 | 33.4 |
| 11 | 0.004 | 0.002 | 9.65 | 48.3 | 33.0 |
| 12 | 0.004 | 0.003 | 10.25 | 48.7 | 32.6 |

These examples clearly demonstrates that addition of the proteases Alcalase and Neutrase but not Flavorzyme has a positive effect on the generation of particular free available amino nitrogen (FAN) and that neutrase had the most positive effect on FAN generation. Thus the choice of protease is a critical parameter for FAN generation.

Example 6

A grist comprising 0-90% unmalted barley was prepared as described above. Then all cups were added the enzymes β-glucanase and xylanase. The mashing was performed and the cups were added city water to a total of 300 g after mashing. The mash was filtered, and the results in the table 8 were obtained by analyzing the wort:

The following experiment is to demonstrate the effect on the turbidity (NTU) with increasing amount of unmalted barley, when only filtration enzyme blend β-glucanase and xylanase (Ultraflo Max 300 ppm) is added.

TABLE 8

NTU when increasing amount of malt barley is substituted with unmalted barley, from 0% unmalted barley to 90% unmalted barley.

| | % barley | NTU |
|---|---|---|
| 1 | 0 | 19.8 |
| 2 | 8 | 19.7 |
| 3 | 16 | 15.3 |
| 4 | 24 | 12.4 |
| 5 | 32 | 12 |
| 6 | 40 | 10.2 |

TABLE 8-continued

NTU when increasing amount of malt barley is substituted with un-
malted barley, from 0% unmalted barley to 90% unmalted barley.

| % barley | NTU |
|---|---|
| 7 | 48 | 10.8 |
| 8 | 56 | 8.43 |
| 9 | 64 | 10.9 |
| 10 | 72 | 21 |
| 11 | 80 | 35.7 |
| 12 | 90 | 56.2 |

The result is also shown in FIG. 1. It is evident from this experiment that mashing unmalted barley with simple enzyme blends (only filtration enzymes) becomes increasingly difficult with increasing amount of unmalted barley is substituted for malted barley and when the amount exceeds 80% the turbidity is so high that the wort is difficult to filtrate. Thus when having high amount of unmalted barley adding filtration enzymes alone is not enough to get a wort which is filterable.

Example 7

The purpose of this example was to evaluate the turbidity (NTU) and the filtration of wort from 100% barley infusion mashing with a different dosage of Lipopan F, Lipopan X and β-glucanase and xylanase (Ultraflo Max). The study comprised two independent trials for Lipopan F and Lipopan X, respectively, i.e. 2×12 cups as indicated in table 9 below. A grist comprising 100% unmalted barley was prepared as described previously. Then all cups were added enzymes.

To each cup was added:
3.0 ml 1 M H$_3$PO$_4$,
0.3 KNU(S)/g α-amylase (Termamyl SC),
0.002 AU/g protease (Neutrase 0.8 L),
0.5 PUN/g pullulanase (NS26062), and the enzymes in table 9.

The mashing was performed and the cups were added city water to a total of 300 g after mashing. The mash was filtered, and the results in Table 9 below were obtained by analyzing the wort:

TABLE 9

Enzyme dose Activity/g DM in mashing

| Cup no. | Ultraflo Max EGU/g | Lipopan F LU/g | Lipopan X LU/g | NTU | Filtration ml/10 min | Filtration ml final |
|---|---|---|---|---|---|---|
| 1 | 0.24 | — |  | 116 | 105 | 194 |
| 2 | 0.24 | 1 |  | 120 | 86.0 | 165 |
| 3 | 0.24 | 5 |  | 78.3 | 110 | 195 |
| 4 | 0.24 | 10 |  | 66.1 | 131 | 195 |
| 5 | 0.24 | 20 |  | 50.1 | 168 | 210 |
| 6 | 0.24 | 50 |  | 22.7 | 190 | 210 |
| 7 | 0.16 | 50 |  | 19.7 | 170 | 208 |
| 8 | 0.08 | 50 |  | 19.8 | 178 | 205 |
| 9 | — | 50 |  | 18.5 | 142 | 195 |
| 10 | 0.16 | 10 |  | 67.8 | 114 | 200 |
| 11 | 0.08 | 10 |  | 69.2 | 130 | 200 |
| 12 | — | 10 |  | 49.7 | 95 | 180 |
| 1 | 0.24 |  | — | 110 | 105 | 200 |
| 2 | 0.24 |  | 1 | 92.0 | 70.0 | 165 |
| 3 | 0.24 |  | 5 | 50.0 | 100 | 200 |
| 4 | 0.24 |  | 10 | 107 | 94.0 | 198 |
| 5 | 0.24 |  | 20 | 5.91 | 135 | 205 |
| 6 | 0.24 |  | 50 | 3.36 | 160 | 210 |
| 7 | 0.16 |  | 50 | 3.53 | 150 | 205 |
| 8 | 0.08 |  | 50 | 3.84 | 151 | 205 |
| 9 | — |  | 50 | 4.96 | 100 | 200 |
| 10 | 0.16 |  | 10 | 24.9 | 110 | 200 |
| 11 | 0.08 |  | 10 | 21 | 110 | 200 |
| 12 | — |  | 10 | 8.9 | 75 | 180 |

Both Lipases Lipopan F and Lipopan X markedly reduced the turbidity (NTU) of the wort. Lipopan X is the most efficient (on enzyme activity LU(g)) for reduction of the turbidity in wort, but Lipopan F can reduce the turbidity to a level within the specification of wort. The amount of filtration enzymes can be reduced to 100 ppm in the presence of lipase without reducing the filtration speed significantly.

Example 8

The purpose of this example was to evaluate the effect of the protease Neutrase 0.8 L, phytase and the pullulanase NS26062 (Pul C) on the FAN generation and the wort sugar profile in a standard mashing. A grist comprising 100% unmalted barley was prepared as described above. Then all cups were added α-amylase (Termamyl SC) 0.3 KNU(S)/g, 300 ppm β-glucanase and xylanase (Ultraflo Max), adjusted to pH 5.3, and the protease Neutrase 0.8 L, the phytase and the pullulanase NS26062 (Pul C) enzymes, where added as indicated in Tables 10A and 10B below, and the results obtained:

TABLE 10A

100% barley: FAN generation in wort.
The dosages is enzyme activity unit and ppm
(100 ppm = 100 g/1000 kg unmalted barley). FYT is
phytase unit, PUN is pullulanase activity and AU
is proteolytic activity.

| Enzyme dosages | FAN mg/l/Plato |
|---|---|
| 0 | 5.09 |
| 1.5 FYT | 5.09 |
| 0.5 PUN | 5.11 |
| 1.5 FYT + 0.5 PUN | 5.22 |
| 0.002 AU | 8.58 |
| 0.002 AU + 1.5 FYT | 7.53 |
| 0.002 AU + 0.5 PUN | 7.85 |
| 0.002 AU + 1.5 FYT + 0.5 PUN | 7.91 |
| 0.002 AU + 0.5 PUN + 0.5 FYT | 7.87 |
| 0.002 AU + 0.5 PUN + 5 FYT | 7.77 |
| 0.001 AU + 0.5 PUN + 5 FYT | 7.35 |

TABLE 10B

100% barley: wort sugar profile.

| Enzyme dosage Neutrase 0.8 L (AU) | DP1 % | DP2 % | DP3 % | DP4/4+ % | Fru % |
|---|---|---|---|---|---|
| 0 | 4.15 | 31.80 | 14.82 | 38.13 | 1.82 |
| 0.002 AU | 3.81 | 46.61 | 12.79 | 34.97 | 1.82 |
| 1.5 FYT | 4.13 | 42.11 | 14.78 | 37.14 | 1.85 |
| 0.5 PUN | 4.06 | 44.28 | 18.28 | 31.55 | 1.82 |
| 0 | 4.15 | 31.80 | 14.82 | 38.13 | 1.82 |
| 5.0 FYT + 0.5 PUN | 4.14 | 47.01 | 18.17 | 28.82 | 1.86 |
| 5.0 FYT + 0.5 PUN + 0.001 AU | 3.84 | 50.67 | 17.42 | 26.25 | 1.81 |

TABLE 10B-continued

100% barley: wort sugar profile.

| Enzyme dosage Neutrase 0.8 L (AU) | DP1 % | DP2 % | DP3 % | DP4/4+ % | Fru % |
|---|---|---|---|---|---|
| 5.0 FYT + 0.5 PUN + 0.002 AU | 3.88 | 49.26 | 17.61 | 27.41 | 1.83 |
| 0 | 4.15 | 31.80 | 14.82 | 38.13 | — |
| 0.002 AU | 3.81 | 46.61 | 12.79 | 34.97 | — |
| 0.002 AU + 0.5 PUN | 3.81 | 47.78 | 17.74 | 28.87 | — |
| 0.002 AU + 0.5 PUN + 0.5 FYT | 3.88 | 49.26 | 17.61 | 27.41 | — |
| 0.002 AU + 0.5 PUN + 1.5 FYT | 3.91 | 50.12 | 17.56 | 26.58 | — |
| 0.001 AU + 0.5 PUN + 5.0 FYT | 3.84 | 50.67 | 17.42 | 26.25 | — |

Table 10A shows that the protease increase the FAN in the wort, and table 10B shows that when adding phytase and pullulanase to the protease a comparable high amount of DP1-DP3 could be generated with protease concentrations of 0.001 and 0.002 AU respectively. Thus the protease concentration could be reduced in the production of maltose wort when phytase and pullulanase is present without reducing the amount of fermentable sugars (DP1-DP3).

Example 9

The purpose of this example was to elucidate some general parameters concerning wort prepared on 100% unmalted barley in order to identify critical issues compared to wort prepared on malted barley.

Malt mashing (100%) with no enzyme added and unmalted barley (100%) mashing, with enzyme blend. The wort was boiled, and beer fermentation performed with 100% (barley) malt and a 100% unmalted barley wort.
Data:
Mashing:
Barley: Scarlet and malt from same batch of Scarlet.
Mash: 10 kg malt or barley, +35 l mash liquor and spargings 25 l to a total of 60 l.
Profile: 54° C. 30 minutes, increase to 64° C. (1° C./minute) and maintain for 60 minutes, increase to 80° C. (1° C./minute) and maintain for 10 minutes and transfer to lautering.
Enzymes blend in 100% barley mash:
α-amylase (Termamyl SC): 0.3 KNU(S)/g dm
β-glucanase and xylanase (Ultraflo Max): 300 ppm
Protease (Neutrase 0.8 L): 0.0015 AU/g dm
Pullulanase (NS26062, Pul C): 1.0 PUN/g dm
Wort amino acid composition (table 11) analyzed:
The free amino acid analyzed in the wort is organized according to the paper "Elucidation of the Role of Nitrogenous Wort Components in yeast Fermentation" (J. Inst. Brew. 113(1), 3-8, 2007)

TABLE 11

| FAN in wort | Malted barley wort mM | Unmalted barley wort mM |
|---|---|---|
| Group A, fast absorption: | | |
| Aspartic acid | 0.076 | 0.151 |
| Glutamic acid | 0.244 | 0.210 |
| Asparagine | 0.310 | 0.273 |
| Serine | 0.007 | 0.187 |
| Glutamine | 0.074 | 0.048 |
| Threonine | 0.210 | 0.188 |
| Arginine | 0.149 | 0.265 |
| Lysine | 0.216 | 0.354 |
| Sum | 1.286 | 1.675 (130%) |
| Group B, intermediate absorption: | | |
| Valine | 0.245 | 0.252 |
| Methionine | 0.047 | 0.111 |
| Leucine | 0.236 | 0.446 |
| Isoleucine | 0.114 | 0.163 |
| Histidine | 0.157 | 0.091 |
| Sum | 0.798 | 1.064 (133%) |
| Group C, slow absorption: | | |
| Glycine | 0.149 | 0.158 |
| Phenylalanine | 0.196 | 0.206 |
| Tyrosine | 0.131 | 0.158 |
| Tryptophan | 0.087 | 0.062 |
| Alanine | 0.312 | 0.361 |
| Sum | 0.875 | 0.945 (108%) |
| Group D, little or no absorption | | |
| Proline | 2.500 | 0.413 (16.5%) |
| Total - sum | 5.458 | 4.098 |

Table 11 shows that when mashing with 100% unmalted barley and an enzyme blend comprising α-amylase activity, β-glucanase activity, protease activity and a pullulanase activity a wort can be produced which has considerably less of the for the yeast unusable amino acid proline, which is clearly advantageous since the presence of this amino acid in a beer product gives an unpleasant taste. In addition, the amount of amino acids in the groups A and B, which could be quickly metabolised by the yeast, is considerably increased when mashing unmalted barley and the enzyme blend comprising α-amylase activity, β-glucanase activity, protease activity and a pullulanase. Thus it is clear from this example that the proline concentration is less than 2 mM, and the serine and methionine concentration is above 0.1 mM and 0.05 mM respectively.

Example 10

The following experiment analyses the wort obtained from grist comprising 100% unmalted barley and 100% malt. The trials have been executed at Ziemann GmbH, Ludwigburg, Germany. All analysis has been done according to the Analytica EBC or MEBAK respectively. (van Erde, P., Analytica-EBC. 1998, Nurnberg: Verlag Hans Carl.; Anger, H., MEBAK Band Rohstoffe. 1. Auflage ed. Brautechnische Analysenmethoden. 2006, Freising: Selbstverlag der MEBAK).

The barley used was a two rowed spring barley from Germany harvest 2008.
The enzymes added were:
α-amylase (Termamyl SC): 0.3 KNU(S)/g cereal
β-glucanase and xylanase (Ultraflo Max): 300 ppm
Protease (Neutrase 0.8 L): 0.001 AU/g dm
Pullulanase (NS26062, Pul C): 2.0 PUN/g dm
Lipase (Lipozyme TL 100): 20 LU/g dm The mashing profile used was 54° C. at 30 min; increase the temperature 1° C./min to 64° C. and rest for 60 min increase the temperature 1° C./min to 78° C. and rest for 30 min, total mashing time 144 min.

TABLE 12

Wort composition of 100% barley brews in comparison with all malt specifications

| Analysis | unit | method | 100% unmalted barley | 100% malted barley |
|---|---|---|---|---|
| Viscosity (12%) | mPas | MEBAK II | 1.76 | <1.8 |
| iodine value | | MEBAK II | 0.28 | <0.35 |
| RDF | % | MEBAK II | 69.2 | 68-72 |
| sol Nitrogen (12%) | mg/100 ml | MEBAK II | 102.5 | |
| FAN (12%) | ppm | MEBAK II | 180 | |
| Turbidity | EBC | MEBAK II | <80 NTU | <80 NTU |

The results show 100% unmalted barley in combination with the enzyme blend comprising α-amylase activity, β-glucanase activity, proteolytic activity and pullulanase debranching activity can fully match all malt specification in all key parameters like viscosity, turbidity, free amino nitrogen supply, yield and final attenuation are within all malt (100% malt) specifications.

The lauter performance was also investigated. The turbidity in the lauter wort describes the quality of the lauter performance. The lipase component in the enzyme blend was able to reduce the normally significant higher haze level of unmalted barley approaches to haze levels below 80 NTU within a comparable lauter time.

Figure 2:
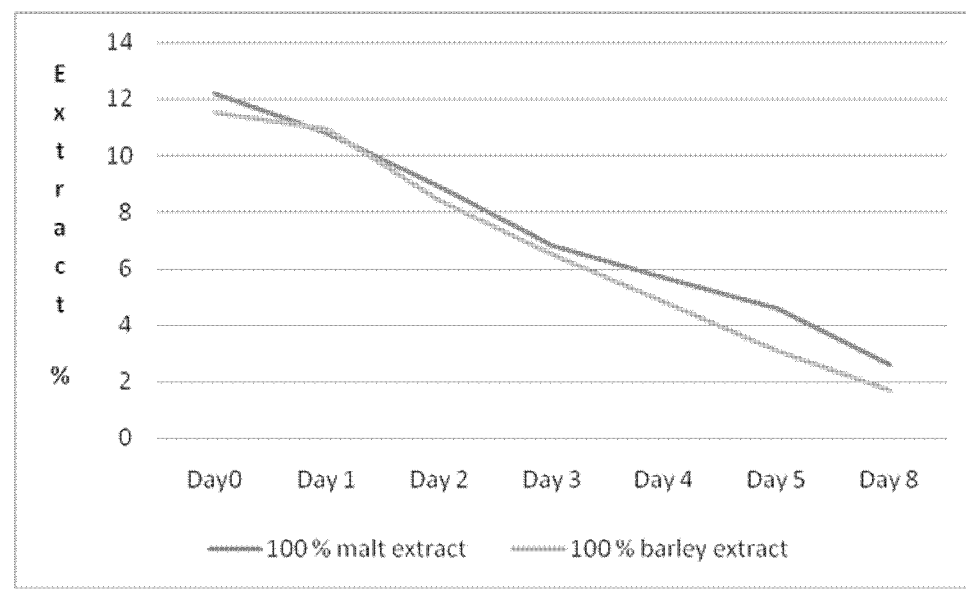
FIG. 2 shows the fermentability of a wort produced from 100% unmalted barley or 100% malted barley.

Also the fermentation performance was tested: 8 hl of wort from 100% malt and 8 hl of wort from 100% unmalted barley was fermented. The result is demonstrated in FIG. 2. Both worts have been fermented with bottom fermenting yeast strain W34, FIG. 2 shows the comparable extract drop of both brews. Furthermore, no differences in ethanol production have been found.

Finally the barley beer has been tasted by a professional taste panel at the institute for brewing technology 1 in Weihenstephan, Germany. The results show comparable result to a standard lager beer with indications of enhanced flavour stability.

TABLE 13

Weihenstephan taste evaluation of 100% unmalted barley beer

| | 100% unmalted barley Fresh | 100% unmalted barley forced aged | 100% unmalted barley fresh | 100% unmalted barley Forced aged |
|---|---|---|---|---|
| Taste | 4.0 | 3.5 | 3.8 | 3.5 |
| Flavor | 4.0 | 3.4 | 3.8 | 3.4 |

TABLE 13-continued

Weihenstephan taste evaluation of 100% unmalted barley beer

| | 100% unmalted barley Fresh | 100% unmalted barley forced aged | 100% unmalted barley fresh | 100% unmalted barley Forced aged |
|---|---|---|---|---|
| Body | 4.0 | 3.8 | 4.0 | 3.8 |
| Bitterness total | 4.1 | 3.9 | 4.1 | 3.9 |
| Total | 4.03 | 3.61 | 3.91 | 3.56 |

General evaluation: DLG 5 = very good, 1 unacceptable.

Example 11

The following examples was to evaluate different important parameters when mashing on a grist comprising 30% corn grist or rice (unmalted) with 70% unmalted barley main mash and an enzyme blend comprising α-amylase activity, β-glucanase activity, protease activity and a pullulanase.

The process used were decoction mashing where the rice or corn grist part where boiled with thermostable α-amylase and then mixed with the mash comprising unmalted barley. The enzymes added to 70% barley mash+30% corn grist or rice:

α-amylase (Termamyl SC): 0.3 KNU(S)/g dm
β-glucanase and xylanase (Ultraflo Max): 300 ppm (0.23 EGU/g)
Protease (Neutrase 0.8 L): 0.001 and 0.002 AU/g dm
Pullulanase was also added to the unmalted barley mash and the concentration was variated, see table 14 and 15, the pullulanase added is (NS26062, Pul C).

The mashing was performed as follows: The milled barley was added to mashing cup (40.0 g as is) and added 115 g water at 60° C., CaCl (330 g/1000 kg barley) was added in addition with the enzyme blend indicated above. The mixture was maintain at 54° C. for 30 minutes, then the decoction mash are added (15.4 g dm) and temperature maintained at 64° C. in 60 minutes, increased to 80° C. and maintained 10 minutes, cooled and filtrated. All the mashes could be filtrated without any problem and no significant differences between the different enzymes dosage.

The preparation of the decoction mash was performed as follows: The rice or corn grist was mixed with water (5.66 part) at a temperature of 60° C.-70° C., CaCl2 (220 g/1000 kg grist) was added in addition with an α-amylase (Termamyl SC 0.600 kg/1000 kg grist). The mixture was heated to 85° C. and kept at that temperature for 20 minutes, the heat was increased 100° C. (boiling) and kept at that temperature (boiling) for 15 minutes. The mixture was cooled to 80° C. and mixed with the barley containing mash.

The mashing was performed and the cups were added city water to a total of 300 g after mashing. The mash was filtered, and the results in Table 14 below were obtained by analyzing the wort. In some examples the wort was boiled 10 minutes diluted 9.7 Plato and fermented by Forced Fermentation, Analytica—EBC nr. 8.6.

TABLE 14

FAN, RDF and sugar content of a wort from mash based on decoction of 30% corn grist and 70% unmalted barley mash which is mixed.

| Cup No | Neutrase AU/g | NS26062 PUN/g | Wort carbohydrate profile in % | | | | | FAN ppm | RDF % |
|---|---|---|---|---|---|---|---|---|---|
| | | | DP1: | DP2: | DP3: | DP4+: | Plato° | | |
| 1 | 0.001 | — | 5.17 | 54.31 | 12.02 | 28.50 | 14.48 | 106 | 64.4 |
| 2 | 0.001 | 0.5 | 5.47 | 58.23 | 14.73 | 21.56 | 14.45 | 106 | 70.7 |
| 3 | 0.001 | 1.0 | 5.48 | 60.48 | 15.79 | 18.25 | 14.54 | 107 | 73.6 |

TABLE 14-continued

FAN, RDF and sugar content of a wort from mash based on decoction of 30% corn grist and 70% unmalted barley mash which is mixed.

| Cup No | Neutrase AU/g | NS26062 PUN/g | Wort carbohydrate profile in % | | | | Plato° | FAN ppm | RDF % |
|---|---|---|---|---|---|---|---|---|---|
| | | | DP1: | DP2: | DP3: | DP4+: | | | |
| 4 | 0.001 | 1.5 | 5.59 | 61.77 | 16.35 | 16.29 | 14.45 | 107 | 75.3 |
| 5 | 0.001 | 2.0 | 5.57 | 62.88 | 16.66 | 14.89 | 14.49 | 108 | 76.5 |
| 6 | 0.001 | 2.5 | 5.60 | 63.35 | 16.96 | 14.09 | 14.46 | 106 | 77.2 |
| 7 | 0.002 | — | 5.54 | 54.29 | 12.50 | 27.67 | 14.28 | 131 | 64.6 |
| 8 | 0.002 | 0.5 | 5.60 | 58.37 | 15.13 | 20.90 | 14.34 | 131 | 70.8 |
| 9 | 0.002 | 1.0 | 5.53 | 60.43 | 16.10 | 17.93 | 14.83 | 129 | 73.8 |
| 10 | 0.002 | 1.5 | 5.66 | 61.83 | 16.58 | 15.93 | 14.34 | 130 | 75.3 |
| 11 | 0.002 | 2.0 | 5.66 | 62.71 | 16.92 | 14.70 | 14.33 | 131 | 76.4 |
| 12 | 0.002 | 2.5 | 5.73 | 63.21 | 17.18 | 13.88 | 14.31 | 130 | 77.3 |

TABLE 15

FAN, RDF and sugar content of a wort from mash based on decoction of 30% rice grist and 70% unmalted barley mash which is mixed.

| Cup No | Neutrase AU/g | NS26062 PUN/g | Wort carbohydrate profile in % | | | | Plato° | FAN ppm | RDF % |
|---|---|---|---|---|---|---|---|---|---|
| | | | DP1: | DP2: | DP3: | DP4+: | | | |
| 1 | 0.001 | — | 5.37 | 53.14 | 12.33 | 29.16 | 14.37 | 103 | 62.0 |
| 2 | 0.001 | 0.5 | 5.40 | 57.06 | 15.03 | 22.50 | 14.75 | 104 | 68.8 |
| 3 | 0.001 | 1.0 | 5.57 | 59.18 | 16.02 | 19.24 | 14.53 | 106 | 72.1 |
| 4 | 0.001 | 1.5 | 5.57 | 60.72 | 16.65 | 17.15 | 14.61 | 104 | 74.1 |
| 5 | 0.001 | 2.0 | 5.59 | 61.64 | 17.00 | 15.77 | 14.51 | 104 | 75.5 |
| 6 | 0.001 | 2.5 | 5.65 | 62.38 | 17.28 | 14.67 | 14.52 | 105 | 76.6 |
| 7 | 0.002 | — | 5.50 | 53.23 | 12.79 | 28.48 | 14.45 | 125 | 62.4 |
| 8 | 0.002 | 0.5 | 5.55 | 57.09 | 15.28 | 22.08 | 14.45 | 124 | 69.0 |
| 9 | 0.002 | 1.0 | 5.65 | 59.17 | 16.32 | 18.86 | 14.44 | 126 | 72.1 |
| 10 | 0.002 | 1.5 | 5.68 | 60.38 | 16.95 | 16.99 | 14.45 | 127 | 73.9 |
| 11 | 0.002 | 2.0 | 5.67 | 61.37 | 17.38 | 15.58 | 14.45 | 126 | 75.3 |
| 12 | 0.002 | 2.5 | 5.72 | 62.11 | 17.56 | 14.59 | 14.39 | 127 | 76.7 |

Table 14 and 15 shows the sugar profile, Plato, FAN and RDF of the wort based on mashing a grist comprising 30% corn or rice and 70% unmalted barley (100% unmalted grains). The result shows clearly that the amount of fermentable sugars (DP1-3) is very high (above 80%), the RDF is above 60% and increasing with increasing pullulanase concentration and the FAN is high and increasing with increasing protease concentration, when the wort is produced from 100% unmalted grains comprising 70% unmalted barley and 30% unmalted corn grist or rice and an enzyme blend comprising α-amylase activity, β-glucanase activity, protease activity and a pullulanase. There were no significant difference between using rice or corn grist.

Example 12

The following examples were to evaluate different important parameters when mashing on a grist comprising 50% barley+50% wheat mash and the following enzymes:
  α-amylase (Termamyl SC): 0.3 KNU(S)/g dm (dry matter)
  β-glucanase and xylanase (Ultraflo Max): 300 ppm/0.23 EGU/g dm
  Protease (Neutrase): 0.001 AU/g dm
  Lipase (Lipozyme TL): 20 LU/g dm
  Pullulanase (NS26062, Pul C): 0-3.0 PUN/g dm
In one example the pullulanase concentration was varied, see table 17, the pullulanase added is (NS26062, Pul C).
In the other two examples the enzyme blend concentration pr kg raw material was varied, see table 18.

The mash was prepared by mixing milled barely and wheat (25 g of each (total 50.0 g) with 200 g water added to mashing cups, then Ca2+ and the enzyme blend indicated above were added and mashing started.

The mashing profile was as follows: The mash was heated to 54° C. (1° C./min.) and kept at that temperature for 30 minutes, the temperature was increased to 64° C. within 10 minutes and maintain at that temperature for 45 minutes, the temperature was increased to 80° C. within 16 minutes and maintain at that temperature for 10 minutes. Water to 300 g total was added and the mash was filtered.

The wort was filtered and in some examples the wort was boiled 10 minutes diluted 9.7 Plato and fermented by Forced Fermentation.

The results are showed in FIG. 3 and in table 16 and 17.

TABLE 16

The enzyme blend was as described above Termamyl SC, Ultraflo Max, Neutrase, and Lipozyme TL with different concentrations (PUN/g) of pullulanase (NS26062) added.

| Enzymes | filtration | | Plato | pH | NTU | RDF % |
|---|---|---|---|---|---|---|
| | ml after 10 minutes | ml total | | | | |
| 0 PUN/g + enzyme blend | 158 | 208 | 12.96 | 5.80 | 4 | 64.2 |
| 0.5 PUN/g + enzyme blend | 179 | 215 | 12.84 | 5.70 | 4 | 69.8 |

TABLE 16-continued

The enzyme blend was as described above Termamyl SC, Ultraflo Max, Neutrase, and Lipozyme TL with different concentrations (PUN/g) of pullulanase (NS26062) added.

| Enzymes | filtration ml after 10 minutes | ml total | Plato | pH | NTU | RDF % |
|---|---|---|---|---|---|---|
| 1.0 PUN/g + enzyme blend | 159 | 206 | 13.06 | 5.70 | 3 | 72.0 |
| 1.5 PUN/g + enzyme blend | 154 | 213 | 13.08 | 5.70 | 3 | 72.5 |
| 2.0 PUN/g + enzyme blend | 159 | 209 | 13.05 | 5.50 | 3 | 73.0 |
| 2.5 PUN/g + enzyme blend | 146 | 206 | 13.10 | 5.6 | 3 | 73.4 |
| 3.0 PUN/g + enzyme blend | 159 | 208 | 13.08 | 5.70 | 3 | 73.6 |

Table 16 shows that a wort made form a grist comprising 50% wheat and 50% barley, that is 100% unmalted grains and mashed with an enzyme blend comprising α-amylase activity, β-glucanase activity, protease activity, lipase activity and a pullulanase is filterable and with low turbidity and importantly the RDF is high (above 65%) and increasing with increasing amount of pullulanase NS26062 (Pul C).

In table 17 the enzyme blend was as described above Termamyl SC, Ultraflo Max, Neutrase, and Lipozyme TL in the same relative amount, but in this example the amount of the blend relative to amount of raw material was varied. All blend were with 1.0 PUN of pullulanase (NS26062) added.

TABLE 17

Different doses of enzyme blend

| Enzymes | filtration ml after 10 minutes | ml total | ml total | pH | NTU | RDF % |
|---|---|---|---|---|---|---|
| 100% enzyme blend | 159 | 206 | 13.06 | 5.70 | 3 | 72.0 |
| 125% enzyme blend | 169 | 208 | 13.12 | 5.70 | 4 | 72.0 |
| 150% enzyme blend | 164 | 204 | 13.12 | 5.70 | 3 | 72.4 |
| 175% enzyme blend | 145 | 204 | 13.06 | 5.70 | 3 | 72.9 |
| 200% enzyme blend | 147 | 205 | 13.10 | 5.70 | 3 | 72.9 |
| 300% enzyme blend | 150 | 204 | 13.21 | 5.70 | 3 | 73.5 |

With all tested amounts of enzyme blend comprising α-amylase activity, β-glucanase activity, protease activity, lipase activity and a pullulanase the wort produced had a very high amount of RDF above 70%, it was slightly increasing with increasing amounts of enzyme blend. However, a high RDF and good filterability was obtained with 2 kg/1000 kg enzyme blend/raw material, which corresponded to 100% enzyme blend. Importantly the total mashing time was 2 hours.

The invention claimed is:

1. A process for the production of a brewer's wort, comprising:
   (a) obtaining a mash from a grist, of which at least 70 wt. % is unmalted cereal(s) comprising an endogenous β-amylase and of which less than 30 wt. % is malted cereal(s);
   (b) contacting the mash with exogenous enzymes at a temperature at which exogenous enzymes and the endogenous β-amylase are active, wherein the exogenous enzymes comprise:
      i. an α-amylase,
      ii. a pullulanase,
      iii. a protease,
      iv. a β-glucanase,
      v. a lipase, and
      vi. a xylanase;
   wherein the pullulanase is a pullulanase having at least 90% identity to the amino acid sequence shown in SEQ ID NO: 8; and
   (c) mashing-off and filtering the mash to obtain the brewer's wort, wherein the wort has a glucose concentration below 10%.

2. The process of claim 1, wherein the unmalted cereal(s) are barley, spelt, wheat, rye, corn, oat or rice or any mixture thereof.

3. The process of claim 1, wherein the unmalted cereal is barley.

4. The process of claim 1, wherein the grist further comprises other carbohydrate sources.

5. The process of claim 1, where the exogenous enzymes further comprises a phytase.

6. The process of claim 1, wherein the temperature is in a range optimizing the activity of the β-amylase.

7. The process of claim 1, wherein step (b) comprises a first step carried out between 50 and 58° C., a second step carried out between 60 and 65° C., and a third step carried out between 70 and 80° C.

8. The process of claim 7, wherein step (b) is completed within 160 minutes.

9. The process of claim 1, wherein the α-amylase is an α-amylase having at least 70% identity to the amino acid sequence shown in SEQ ID NO: 1.

10. The process of claim 1, wherein the pullulanase is thermostable having a relative enzyme activity above 60% over a period of 30 min, at 65° C. and pH 5.

11. The process of claim 1, wherein the protease is selected from the group consisting of endo-proteases, exo-peptidases, and combinations thereof.

12. The process of claim 1, wherein the protease has at least 70% identity to the amino acid sequence shown in SEQ ID NO: 3.

13. The process of claim 1, wherein the lipase is a lipase from *Aspergillus*, *Fusarium*, or *Rhizopus*.

14. The process of claim 1, wherein the grist comprises at least 80 wt. % unmalted cereal(s).

15. The process of claim 1, wherein the grist comprises at least 90 wt. % unmalted cereal(s).

16. The process of claim 1, wherein the grist comprises at least 95 wt. % unmalted cereal(s).

17. The process of claim 1, wherein the grist comprises 100 wt. % unmalted cereal(s).

18. A wort produced of the process of claim 1.

19. The wort of claim 18, comprising one or more amino acids selected from:
   (a) proline at a concentration at less than 2 mM;
   (b) serine at a concentration above 0.1 mM; and
   (c) methionine at a concentration above 0.05 mM.

20. The wort of claim 19, having a maltose concentration above 40% of the total concentration of carbohydrates.

21. The wort of claim 19, wherein the total of the glucose, maltose and maltotriose concentration is above 60% of the total concentration of carbohydrates.

22. The process of claim 1, where the pullulanase is a pullulanase having at least 95% identity to the amino acid sequence shown in SEQ ID NO: 8.

23. The process of claim 1, where the pullulanase is a pullulanase having at least 98% identity to the amino acid sequence shown in SEQ ID NO: 8.

24. The process of claim 1, where the pullulanase is a pullulanase having at least 99% identity to the amino acid sequence shown in SEQ ID NO: 8.

* * * * *